US008689253B2

(12) United States Patent
Hallberg et al.

(10) Patent No.: US 8,689,253 B2
(45) Date of Patent: Apr. 1, 2014

(54) METHOD AND SYSTEM FOR CONFIGURING MEDIA-PLAYING SETS

(75) Inventors: Bryan Severt Hallberg, Vancouver, WA (US); Gary A. Feather, Camas, WA (US); George Rome Borden, Portland, OR (US); Vishnu-Kumar Shivaji-Rao, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1606 days.

(21) Appl. No.: 11/367,937

(22) Filed: Mar. 3, 2006

(65) Prior Publication Data

US 2007/0209047 A1   Sep. 6, 2007

(51) Int. Cl.
*H04N 5/445* (2011.01)
*G06F 3/00* (2006.01)

(52) U.S. Cl.
USPC .......... 725/37; 725/46; 725/52; 715/700; 715/705; 715/744; 715/747

(58) Field of Classification Search
USPC .............. 725/37, 46, 52; 715/744, 747
See application file for complete search history.

(56) References Cited

U.S. PATENT DOCUMENTS

| | | | |
|---|---|---|---|
| 4,183,056 A | 1/1980 | Evans et al. |
| 4,253,108 A | 2/1981 | Engel |
| 4,298,884 A | 11/1981 | Reneau |
| 4,321,635 A | 3/1982 | Tsuyuguchi |
| 4,324,402 A | 4/1982 | Klose |
| 4,520,404 A | 5/1985 | Von Kohorn |
| 4,729,044 A | 3/1988 | Kiesel |

(Continued)

FOREIGN PATENT DOCUMENTS

| | | |
|---|---|---|
| EP | 0 854 645 | 7/1998 |
| EP | 0 878 964 | 11/1998 |

(Continued)

OTHER PUBLICATIONS

Yuichi Yagawa et al., "TV Program Planning Agent using Analysis Method of User's Taste", Technical report of IEICE, vol. 98, No. 437, A198-54-61, Dec. 1, 1998.

(Continued)

*Primary Examiner* — Nasser Goodarzi
*Assistant Examiner* — Kyu Chae
(74) *Attorney, Agent, or Firm* — Chernoff Vilhauer McClung & Stenzel, LLP

(57) ABSTRACT

A remote support site having a detector internally collecting information on a user-selectable intrinsic broadcast characteristic of a media-playing set or television and a server enabling specification of a preferred setting for such characteristic from this information. A method including maintaining a remote site, therefrom internally collecting information from the set about a user-selectable intrinsic broadcast characteristic, and therefrom specifying a preferred setting for such characteristic. A similar method but information detected upon user request about user-adjustable component for selecting on-screen characteristic and final step is remotely adjusting component. A similar method but information is about broadcast characteristic potentially selectable initially by user instead remotely specified initially. A similar method but information is about plural broadcast characteristics and final step is remotely providing settings for each. Two methods on menu-free TV control via remote and a method listing possible broadcast outcomes so user can readily target outcome to resolve.

12 Claims, 9 Drawing Sheets

(56) References Cited

U.S. PATENT DOCUMENTS

| | | |
|---|---|---|
| 4,937,685 A | 6/1990 | Barker et al. |
| 5,012,334 A | 4/1991 | Etra |
| 5,027,400 A | 6/1991 | Baji et al. |
| 5,101,364 A | 3/1992 | Davenport et al. |
| 5,109,482 A | 4/1992 | Bohrman |
| 5,148,154 A | 9/1992 | MacKay et al. |
| 5,200,825 A | 4/1993 | Perine |
| 5,222,924 A | 6/1993 | Shin et al. |
| 5,223,924 A | 6/1993 | Strubbe |
| 5,241,671 A | 8/1993 | Reed et al. |
| 5,288,069 A | 2/1994 | Matsumoto |
| D348,251 S | 6/1994 | Hendricks |
| 5,333,091 A | 7/1994 | Iggulden et al. |
| 5,339,393 A | 8/1994 | Duffy et al. |
| D354,059 S | 1/1995 | Hendricks |
| 5,381,477 A | 1/1995 | Beyers, II et al. |
| 5,404,316 A | 4/1995 | Klingler et al. |
| 5,410,344 A | 4/1995 | Graves et al. |
| 5,424,770 A | 6/1995 | Schmelzer et al. |
| 5,434,678 A | 7/1995 | Abecassis |
| 5,444,499 A | 8/1995 | Saitoh |
| 5,452,016 A | 9/1995 | Ohara et al. |
| 5,459,830 A | 10/1995 | Ohba et al. |
| 5,483,278 A | 1/1996 | Strubbe et al. |
| D368,263 S | 3/1996 | Hendricks |
| 5,521,841 A | 5/1996 | Arman et al. |
| 5,550,965 A | 8/1996 | Gabbe et al. |
| 5,559,549 A | 9/1996 | Hendricks et al. |
| 5,589,945 A | 12/1996 | Abecassis |
| 5,600,364 A | 2/1997 | Hendricks et al. |
| 5,600,573 A | 2/1997 | Hendricks et al. |
| 5,600,781 A | 2/1997 | Root et al. |
| 5,610,653 A | 3/1997 | Abecassis |
| 5,634,849 A | 6/1997 | Abecassis |
| 5,635,982 A | 6/1997 | Zhang et al. |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |
| 5,664,227 A | 9/1997 | Mauldin et al. |
| 5,675,752 A | 10/1997 | Scott et al. |
| 5,682,195 A | 10/1997 | Hendricks et al. |
| 5,682,460 A | 10/1997 | Hyziak et al. |
| 5,684,918 A | 11/1997 | Abecassis |
| 5,694,163 A | 12/1997 | Harrison |
| 5,696,869 A | 12/1997 | Abecassis |
| 5,696,965 A | 12/1997 | Dedrick |
| 5,710,884 A | 1/1998 | Dedrick |
| 5,717,814 A | 2/1998 | Abecassis |
| 5,717,879 A | 2/1998 | Moran et al. |
| 5,717,923 A | 2/1998 | Dedrick |
| 5,724,472 A | 3/1998 | Abecassis |
| 5,727,129 A | 3/1998 | Barrett et al. |
| 5,732,216 A | 3/1998 | Logan et al. |
| 5,734,853 A | 3/1998 | Hendricks et al. |
| 5,751,953 A | 5/1998 | Shiels et al. |
| 5,758,257 A | 5/1998 | Herz et al. |
| 5,758,259 A | 5/1998 | Lawler |
| 5,761,881 A | 6/1998 | Wall |
| 5,764,916 A | 6/1998 | Busey et al. |
| 5,774,357 A | 6/1998 | Hoffberg et al. |
| 5,774,666 A | 6/1998 | Portuesi |
| 5,778,108 A | 7/1998 | Coleman, Jr. |
| 5,781,188 A | 7/1998 | Amiot et al. |
| 5,794,210 A | 8/1998 | Goldhaber et al. |
| 5,797,001 A | 8/1998 | Augenbraun et al. |
| 5,798,785 A | 8/1998 | Hendricks et al. |
| 5,805,733 A | 9/1998 | Wang et al. |
| 5,809,426 A | 9/1998 | Radojevic et al. |
| 5,821,945 A | 10/1998 | Yeo et al. |
| 5,822,537 A | 10/1998 | Katseff et al. |
| 5,828,809 A | 10/1998 | Chang et al. |
| 5,828,839 A | 10/1998 | Moncreiff |
| 5,835,087 A | 11/1998 | Herz et al. |
| D402,310 S | 12/1998 | Hendricks |
| 5,848,396 A | 12/1998 | Gerace |
| 5,857,190 A | 1/1999 | Brown |
| 5,861,881 A | 1/1999 | Freeman et al. |
| 5,867,226 A | 2/1999 | Wehmeyer et al. |
| 5,867,386 A | 2/1999 | Hoffberg et al. |
| 5,875,107 A | 2/1999 | Nagai et al. |
| 5,875,108 A | 2/1999 | Hoffberg et al. |
| 5,877,821 A | 3/1999 | Newlin et al. |
| 5,878,222 A | 3/1999 | Harrison |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,907,324 A | 5/1999 | Larson et al. |
| 5,913,013 A | 6/1999 | Abecassis |
| 5,913,030 A | 6/1999 | Lotspiech et al. |
| 5,920,300 A | 7/1999 | Yamazaki et al. |
| 5,920,360 A | 7/1999 | Coleman, Jr. |
| 5,920,477 A | 7/1999 | Hoffberg et al. |
| 5,923,365 A | 7/1999 | Tamir et al. |
| 5,926,624 A | 7/1999 | Katz et al. |
| 5,930,783 A | 7/1999 | Li et al. |
| 5,933,811 A | 8/1999 | Angles et al. |
| 5,945,988 A | 8/1999 | Williams et al. |
| 5,956,026 A | 9/1999 | Ratakonda |
| 5,956,037 A | 9/1999 | Osawa et al. |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,977,964 A | 11/1999 | Williams et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,094 A | 11/1999 | Eggen et al. |
| 5,995,095 A | 11/1999 | Ratakonda |
| 6,002,833 A | 12/1999 | Abecassis |
| 6,005,565 A | 12/1999 | Legall et al. |
| 6,005,597 A | 12/1999 | Barrett et al. |
| 6,006,265 A | 12/1999 | Rangan et al. |
| 6,008,836 A * | 12/1999 | Bruck et al. .................. 725/131 |
| 6,011,895 A | 1/2000 | Abecassis |
| 6,014,183 A | 1/2000 | Hoang |
| 6,020,883 A | 2/2000 | Herz et al. |
| 6,029,195 A | 2/2000 | Herz |
| 6,038,367 A | 3/2000 | Abecassis |
| 6,041,323 A | 3/2000 | Kubota |
| 6,049,821 A | 4/2000 | Theriault et al. |
| 6,052,554 A | 4/2000 | Hendricks et al. |
| 6,055,018 A | 4/2000 | Swan |
| 6,055,569 A | 4/2000 | O'Brien et al. |
| 6,060,167 A | 5/2000 | Morgan et al. |
| 6,064,385 A | 5/2000 | Sturgeon et al. |
| 6,064,449 A | 5/2000 | White et al. |
| 6,067,401 A | 5/2000 | Abecassis |
| 6,070,167 A | 5/2000 | Qian et al. |
| 6,072,934 A | 6/2000 | Abecassis |
| 6,076,166 A | 6/2000 | Moshfeghi et al. |
| 6,078,917 A | 6/2000 | Paulsen, Jr. et al. |
| 6,078,928 A | 6/2000 | Schnase et al. |
| 6,081,278 A | 6/2000 | Chen |
| 6,081,750 A | 6/2000 | Hoffberg et al. |
| 6,088,455 A | 7/2000 | Logan et al. |
| 6,088,722 A | 7/2000 | Herz et al. |
| 6,091,886 A | 7/2000 | Abecassis |
| RE36,801 E | 8/2000 | Logan et al. |
| 6,100,941 A | 8/2000 | Dimitrova et al. |
| 6,115,709 A | 9/2000 | Gilmour et al. |
| 6,122,657 A | 9/2000 | Hoffman, Jr. et al. |
| 6,128,624 A | 10/2000 | Papierniak et al. |
| 6,133,909 A | 10/2000 | Schein et al. |
| 6,137,486 A | 10/2000 | Yoshida et al. |
| 6,141,041 A | 10/2000 | Carlbom et al. |
| 6,141,060 A | 10/2000 | Honey et al. |
| 6,144,375 A | 11/2000 | Jain et al. |
| 6,151,444 A | 11/2000 | Abecassis |

(56) References Cited

U.S. PATENT DOCUMENTS

| | | | |
|---|---|---|---|
| D435,561 S | 12/2000 | Pettigrew et al. |
| 6,157,377 A | 12/2000 | Shah-Nazaroff et al. |
| 6,160,989 A | 12/2000 | Hendricks et al. |
| 6,161,142 A | 12/2000 | Wolfe et al. |
| 6,163,316 A | 12/2000 | Killian |
| 6,163,779 A | 12/2000 | Mantha et al. |
| 6,169,542 B1 | 1/2001 | Hooks et al. |
| 6,177,931 B1 | 1/2001 | Alexander et al. |
| 6,181,335 B1 | 1/2001 | Hendricks et al. |
| 6,185,625 B1 | 2/2001 | Tso et al. |
| 6,195,497 B1 | 2/2001 | Nagasaka et al. |
| 6,198,767 B1 | 3/2001 | Greenfield et al. |
| 6,199,076 B1 | 3/2001 | Logan et al. |
| 6,201,536 B1 | 3/2001 | Hendricks et al. |
| 6,208,805 B1 | 3/2001 | Abecassis |
| 6,212,527 B1 | 4/2001 | Gustman |
| 6,215,526 B1 | 4/2001 | Barton et al. |
| 6,216,129 B1 | 4/2001 | Eldering |
| 6,219,837 B1 | 4/2001 | Yeo et al. |
| 6,226,678 B1 | 5/2001 | Mattaway et al. |
| 6,230,172 B1 | 5/2001 | Purnaveja et al. |
| 6,230,501 B1 | 5/2001 | Bailey, Sr. et al. |
| 6,233,289 B1 | 5/2001 | Fredrickson |
| 6,233,389 B1 | 5/2001 | Barton et al. |
| 6,233,586 B1 | 5/2001 | Chang et al. |
| 6,233,590 B1 | 5/2001 | Shaw et al. |
| 6,236,395 B1 | 5/2001 | Sezan et al. |
| 6,240,406 B1 | 5/2001 | Tannen |
| 6,252,544 B1 | 6/2001 | Hoffberg |
| 6,253,203 B1 | 6/2001 | O'Flaherty et al. |
| 6,263,502 B1 * | 7/2001 | Morrison et al. ............... 725/47 |
| 6,269,216 B1 | 7/2001 | Abecassis |
| 6,275,268 B1 | 8/2001 | Ellis et al. |
| 6,286,140 B1 | 9/2001 | Ivanyi |
| 6,286,141 B1 | 9/2001 | Browne et al. |
| 6,289,165 B1 | 9/2001 | Abecassis |
| 6,298,482 B1 | 10/2001 | Seidman et al. |
| 6,304,665 B1 | 10/2001 | Cavallaro et al. |
| 6,304,715 B1 | 10/2001 | Abecassis |
| 6,311,189 B1 | 10/2001 | DeVries et al. |
| 6,317,718 B1 | 11/2001 | Fano |
| 6,317,881 B1 | 11/2001 | Shah-Nazaroff et al. |
| 6,320,624 B1 | 11/2001 | Ayer et al. |
| 6,324,338 B1 | 11/2001 | Wood et al. |
| 6,339,842 B1 | 1/2002 | Fernandez et al. |
| 6,342,904 B1 | 1/2002 | Vasudevan et al. |
| 6,353,444 B1 | 3/2002 | Katta et al. |
| 6,363,160 B1 | 3/2002 | Bradski et al. |
| 6,363,380 B1 | 3/2002 | Dimitrova |
| 6,370,504 B1 | 4/2002 | Zick et al. |
| 6,370,688 B1 | 4/2002 | Hejna, Jr. |
| 6,374,404 B1 | 4/2002 | Brotz et al. |
| 6,405,371 B1 | 6/2002 | Oosterhout et al. |
| 6,412,008 B1 | 6/2002 | Fields et al. |
| 6,418,168 B1 | 7/2002 | Narita |
| 6,421,680 B1 | 7/2002 | Kumhyr et al. |
| 6,425,133 B1 | 7/2002 | Leary |
| 6,426,761 B1 | 7/2002 | Kanevsky et al. |
| 6,426,974 B2 | 7/2002 | Takahashi et al. |
| 6,438,579 B1 | 8/2002 | Hosken |
| 6,439,572 B1 | 8/2002 | Bowen |
| 6,446,261 B1 | 9/2002 | Rosser |
| 6,470,378 B1 | 10/2002 | Tracton et al. |
| 6,480,667 B1 | 11/2002 | O'Connor |
| 6,487,390 B1 | 11/2002 | Virine et al. |
| 6,490,320 B1 | 12/2002 | Vetro et al. |
| 6,498,783 B1 | 12/2002 | Lin |
| 6,505,243 B1 | 1/2003 | Lortz |
| 6,522,342 B1 | 2/2003 | Gagnon et al. |
| 6,530,082 B1 | 3/2003 | Del Sesto et al. |
| 6,535,639 B1 | 3/2003 | Uchihachi et al. |
| 6,542,546 B1 | 4/2003 | Vetro et al. |
| 6,543,053 B1 | 4/2003 | Li et al. |
| 6,546,555 B1 | 4/2003 | Hjelsvold et al. |
| 6,549,643 B1 | 4/2003 | Toklu et al. |
| 6,553,178 B2 | 4/2003 | Abecassis |
| 6,556,767 B2 | 4/2003 | Okayama et al. |
| 6,571,279 B1 | 5/2003 | Herz et al. |
| 6,578,075 B1 | 6/2003 | Nieminen et al. |
| 6,581,207 B1 | 6/2003 | Sumita et al. |
| 6,587,127 B1 | 7/2003 | Leeke et al. |
| 6,593,936 B1 | 7/2003 | Huang et al. |
| 6,594,699 B1 | 7/2003 | Sahai et al. |
| 6,597,859 B1 | 7/2003 | Leinhart et al. |
| 6,611,876 B1 | 8/2003 | Barrett et al. |
| 6,614,987 B1 | 9/2003 | Ismail et al. |
| 6,621,895 B1 | 9/2003 | Giese |
| 6,628,302 B2 | 9/2003 | White et al. |
| 6,637,032 B1 | 10/2003 | Feinleib |
| 6,658,095 B1 | 12/2003 | Yoakum et al. |
| 6,665,423 B1 | 12/2003 | Mehrotra et al. |
| 6,675,158 B1 | 1/2004 | Rising et al. |
| 6,678,635 B2 | 1/2004 | Tovinkere et al. |
| 6,678,659 B1 | 1/2004 | Van Kommer |
| 6,681,395 B1 | 1/2004 | Nishi |
| 6,691,126 B1 | 2/2004 | Syeda-Mahmood |
| 6,697,523 B1 | 2/2004 | Divakaran et al. |
| 6,704,929 B1 | 3/2004 | Ozer et al. |
| 6,724,933 B1 | 4/2004 | Lin et al. |
| 6,741,655 B1 | 5/2004 | Chang et al. |
| 6,754,904 B1 | 6/2004 | Cooper et al. |
| 6,754,906 B1 | 6/2004 | Finseth et al. |
| 6,766,362 B1 | 7/2004 | Miyasaka et al. |
| 6,774,917 B1 | 8/2004 | Foote et al. |
| 6,810,200 B1 | 10/2004 | Aoyama et al. |
| 6,813,775 B1 | 11/2004 | Finseth et al. |
| 6,820,278 B1 | 11/2004 | Ellis |
| 6,829,781 B1 | 12/2004 | Bhagavath et al. |
| 6,868,440 B1 | 3/2005 | Gupta et al. |
| 6,880,171 B1 | 4/2005 | Ahmad et al. |
| 6,898,762 B2 | 5/2005 | Ellis et al. |
| 6,925,455 B2 | 8/2005 | Gong et al. |
| 6,931,595 B2 | 8/2005 | Pan et al. |
| 6,934,964 B1 | 8/2005 | Schaffer et al. |
| 6,961,954 B1 | 11/2005 | Maybury et al. |
| 6,970,510 B1 | 11/2005 | Wee et al. |
| 6,971,105 B1 | 11/2005 | Weber et al. |
| 6,981,129 B1 | 12/2005 | Boggs et al. |
| 6,983,478 B1 | 1/2006 | Grauch et al. |
| 6,990,679 B2 | 1/2006 | Curreri |
| 6,993,245 B1 | 1/2006 | Harville |
| 7,003,792 B1 | 2/2006 | Yuen |
| 7,026,964 B2 | 4/2006 | Baldwin et al. |
| 7,055,168 B1 | 5/2006 | Errico et al. |
| 7,065,709 B2 | 6/2006 | Ellis et al. |
| 7,096,486 B1 | 8/2006 | Ukai et al. |
| 7,113,181 B2 * | 9/2006 | Tey et al. ...................... 345/204 |
| 7,127,735 B1 | 10/2006 | Lee et al. |
| 7,130,866 B2 | 10/2006 | Schaffer |
| 7,136,710 B1 | 11/2006 | Hoffberg et al. |
| 7,146,626 B1 | 12/2006 | Arsenault et al. |
| 7,150,030 B1 | 12/2006 | Eldering et al. |
| 7,185,355 B1 | 2/2007 | Ellis et al. |
| 7,199,798 B1 | 4/2007 | Echigo et al. |
| 7,249,366 B1 | 7/2007 | Flavin |
| 7,296,285 B1 | 11/2007 | Jun et al. |
| 7,343,381 B2 | 3/2008 | Shin |
| 7,380,262 B2 | 5/2008 | Wang et al. |
| 7,454,775 B1 | 11/2008 | Schaffer et al. |
| 2001/0030664 A1 | 10/2001 | Shulman et al. |
| 2001/0037505 A1 | 11/2001 | Lee et al. |
| 2001/0043744 A1 | 11/2001 | Hieda |
| 2002/0013943 A1 | 1/2002 | Haberman et al. |
| 2002/0018594 A1 | 2/2002 | Xu et al. |
| 2002/0026345 A1 | 2/2002 | Juels |
| 2002/0069218 A1 | 6/2002 | Sull et al. |
| 2002/0079165 A1 | 6/2002 | Wolfe |
| 2002/0080162 A1 | 6/2002 | Pan et al. |
| 2002/0083473 A1 | 6/2002 | Agnihotri et al. |
| 2002/0087967 A1 | 7/2002 | Conkwright et al. |
| 2002/0093591 A1 | 7/2002 | Gong et al. |
| 2002/0097165 A1 | 7/2002 | Hulme |
| 2002/0104087 A1 | 8/2002 | Schaffer et al. |
| 2002/0108112 A1 | 8/2002 | Wallace et al. |

(56) References Cited

U.S. PATENT DOCUMENTS

| | | |
|---|---|---|
| 2002/0111950 A1 | 8/2002 | Lee |
| 2002/0120929 A1 | 8/2002 | Schwalb et al. |
| 2002/0133412 A1 | 9/2002 | Oliver et al. |
| 2002/0140719 A1 | 10/2002 | Amir et al. |
| 2002/0141619 A1 | 10/2002 | Standridge et al. |
| 2002/0156909 A1 | 10/2002 | Harrington |
| 2002/0178135 A1 | 11/2002 | Tanaka |
| 2002/0184220 A1 | 12/2002 | Teraguchi et al. |
| 2002/0190991 A1 | 12/2002 | Efran et al. |
| 2002/0194589 A1 | 12/2002 | Cristofalo et al. |
| 2003/0001880 A1 | 1/2003 | Holtz et al. |
| 2003/0007555 A1 | 1/2003 | Divakaran et al. |
| 2003/0026592 A1 | 2/2003 | Kawahara et al. |
| 2003/0033288 A1 | 2/2003 | Shanahan et al. |
| 2003/0066068 A1 | 4/2003 | Gutta et al. |
| 2003/0066080 A1* | 4/2003 | Kamieniecki .................. 725/80 |
| 2003/0067554 A1 | 4/2003 | Klarfeld et al. |
| 2003/0072440 A1 | 4/2003 | Murray et al. |
| 2003/0081937 A1 | 5/2003 | Li |
| 2003/0084448 A1 | 5/2003 | Soundararajan |
| 2003/0084450 A1 | 5/2003 | Thurston et al. |
| 2003/0088872 A1 | 5/2003 | Maissel et al. |
| 2003/0093792 A1 | 5/2003 | Labeeb et al. |
| 2003/0105682 A1 | 6/2003 | Dicker et al. |
| 2003/0107675 A1* | 6/2003 | Dew et al. ..................... 348/553 |
| 2003/0172374 A1 | 9/2003 | Vinson et al. |
| 2003/0177503 A1 | 9/2003 | Sull et al. |
| 2003/0182663 A1 | 9/2003 | Gudorf et al. |
| 2003/0187650 A1 | 10/2003 | Moore et al. |
| 2003/0229900 A1 | 12/2003 | Reisman |
| 2004/0003041 A1 | 1/2004 | Moore et al. |
| 2004/0015569 A1 | 1/2004 | Lonnfors et al. |
| 2004/0017389 A1 | 1/2004 | Pan et al. |
| 2004/0030750 A1 | 2/2004 | Moore et al. |
| 2004/0032486 A1 | 2/2004 | Shusman |
| 2004/0088289 A1 | 5/2004 | Xu et al. |
| 2004/0098754 A1 | 5/2004 | Vella et al. |
| 2004/0125124 A1 | 7/2004 | Kim et al. |
| 2004/0125877 A1 | 7/2004 | Chang et al. |
| 2004/0197088 A1 | 10/2004 | Ferman et al. |
| 2004/0227768 A1 | 11/2004 | Bates et al. |
| 2004/0231003 A1 | 11/2004 | Cooper et al. |
| 2004/0243940 A1* | 12/2004 | Lee et al. ..................... 715/744 |
| 2004/0250272 A1 | 12/2004 | Durden et al. |
| 2005/0021784 A1 | 1/2005 | Prehofer |
| 2005/0028194 A1 | 2/2005 | Elenbaas et al. |
| 2005/0055713 A1 | 3/2005 | Lee et al. |
| 2005/0086692 A1* | 4/2005 | Dudkiewicz et al. ........... 725/46 |
| 2005/0102202 A1 | 5/2005 | Linden et al. |
| 2005/0131906 A1 | 6/2005 | Shin |
| 2005/0149980 A1* | 7/2005 | Yun ................................ 725/107 |
| 2005/0251827 A1 | 11/2005 | Ellis et al. |
| 2005/0262542 A1 | 11/2005 | DeWeese et al. |
| 2006/0129544 A1 | 6/2006 | Yoon et al. |
| 2006/0200571 A1* | 9/2006 | Backman ..................... 709/230 |
| 2006/0212479 A1* | 9/2006 | Habas et al. ............... 707/104.1 |
| 2006/0215990 A1* | 9/2006 | Proebstel ....................... 386/83 |
| 2006/0294569 A1* | 12/2006 | Chung .......................... 725/133 |
| 2007/0011148 A1 | 1/2007 | Burkey et al. |

FOREIGN PATENT DOCUMENTS

| | | |
|---|---|---|
| EP | 1250807 | 10/2002 |
| GB | 2 325 537 | 11/1998 |
| JP | 08125957 | 5/1996 |
| JP | 09322154 | 12/1997 |
| JP | 2000-101773 | 4/2000 |
| JP | 2000-229577 | 8/2000 |
| JP | 2001-036861 | 2/2001 |
| JP | 2001-085717 | 3/2001 |
| JP | 2001-206550 | 7/2001 |
| JP | 2002-503896 | 2/2002 |
| JP | 2002-244938 | 8/2002 |
| JP | 2002-244938 A | 8/2002 |
| JP | 2003-098970 | 7/2003 |
| WO | WO 94/14284 | 6/1994 |
| WO | WO 98/56188 | 12/1998 |
| WO | WO 99/01984 | 1/1999 |
| WO | WO 99/04143 | 1/1999 |
| WO | WO 99/12194 | 3/1999 |
| WO | WO 99/65237 | 12/1999 |
| WO | WO 01/50753 | 7/2001 |
| WO | 02076100 A2 | 9/2002 |

OTHER PUBLICATIONS

"User Preference Description for MPEG-7," ISO/IEC JTC1/SC29/WG11, MPEG 99/MXXXX, Maui, Hawaii, Dec. 1999, pp. 1-18.

"A Proposal for User Preference Descriptions in MPEG-7," ISO/IEC JTC1SC29/WG11 M5222, MPEG 99, Oct. 4, 1999, pp. 1-6.

Michael G. Christel, Alexander G. Hauptmann, Adrienne S. Warmack, Scott A. Crosby, "Adjustable Filmstrips and Skims as Abstractions for a Digital Video Library," Computer Science Department, Carnegie Mellon University, Pittsburgh, PA 15213 USA.

Peng Xu, et al., "Algorithms and System for High-Level Structure Analysis and Event Detection in Soccer Video," Columbia University, ADVENT—Technical Report #111, Jun. 2001.

Keith Millar and David White, "A Schema for TV-Anytime: Segmentation Metadata AN195," NDS Contribution from MyTV, NDS Limited 2000, 27 pages.

Keith Millar et al., "A Schema for TV-Anytime Segmentation Metadata AN195r! myTV project," NDS Systems Division, NDS Limited 2000, 28 pages.

S.E. Levinson, L. R. Rabiner, and M. M. Sondhi, "An Introduction to the Application of the Theory of Probabilistic Functions of a Markov Process to Automatic Speech Recognition," Copyright 1983 American Telephone and Telegraph company, The Bell system Technical Journal, vol. 62, No. 4, Apr. 1983, pp. 1035-1074.

Dennis Yow, et al., "Analysis and Presentation of Soccer Highlights from Digital Video," To appear in the Proceedings, Second Asian Conference on Computer Vision (ACCV '95).

Drew D. Saur, et al. "Automated Analysis and Annotation of Basketball Video," SPIE vol. 3022, pp. 176-187, 1997.

Hao Pan, et al., "Automatic Detection of Replay Segments in Broadcast Sports Programs by Detection of Logos in Scene Transitions," 2002 IEEE, pp. IV-3385-IV-3388.

Yihong Gong, et al., "Automatic Parsing of TV soccer Programs," 1995 IEEE, pp. 167-174.

Jonathan D. Courtney, "Automatic Video Indexing via Object Motion Analysis," Pattern Recognition, vol. 30, No. 4, pp. 607-625, 1997.

Yong Rui, et al. "Automatically Extracting Highlights for TV Baseball Programs," ACM Multimedia 2000 Los Angeles, CA, USA, pp. 105-115.

Nuno Vasconcelos and Andrew Lippman, "Bayesian Modeling of Video Editing and Structure: Semantic Features for Video Summarization and Browsing," 1998 IEEE, pp. 153-157.

Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-3425, Mar. 20, 1998.

Francis C. Li et al., "Browsing Digital Video," CHI 2000 Apr. 1-6, 2000, CHI Letters vol. 2 issue 1, pp. 169-176.

Franklin Reynolds, et al. "Composite Capability/Preference Profiles (CC/PP): A user side framework for content negotiation," W3C Note Jul. 27, 1999, http://www.w3.org/1999/07/NOTE/CCP-19990727/, 15 pages.

T. Lambrou, et al., "Classification of Audio Signals Using Statistical Features on Time and Wavelet Transform Domains," 1998 IEEE, pp. 3621-3624.

Joshua Alspector,et al., "Comparing Feature-based and Clique-based User Models for Movie Selection," Digital Libraries 98, Pittsburgh, PA, Copyright ACM 1998, pp. 11-18.

Rainer Lienhart, "Comparison of Automatic Shot Boundary Detection Algorithms," Part of the IS&T/SPIE conference on Storage and Retrieval for Image and Video Databases VII, San Jose, CA, Jan. 1999, SPIE vol. 3656, pp. 290-301.

(56) References Cited

OTHER PUBLICATIONS

John Canny, "A Computational Approach to Edge Detection," IEEE Transactions on Pattern Analysis and Machine Intelligence, vol. PAMI-8, No. 6, Nov. 1986, IEEE 1986, pp. 679-698.

Richard Qian et al., "A Computational Approach to Semantic Event Detection," 1999 IEEE, pp. 200-206.

F. Arman, et al., "Content-based Browsing of Video Sequences," to appear in the Proceedings of ACM International Conference on Multimedia '94, Oct. 15-20, San Francisco, CA, 7 pages.

Hongjiang Zhang, et al. "Content-Based Video Browsing Tools," SPIE vol. 2417, 1995, pp. 389-398.

Stephen W. Smoliar, et al. "Content-Based Video Indexing and Retrieval," 1994 IEEE, pp. 62-72.

Stefan Eickeler, et al., "Content-based Video Indexing of TV Broadcast News Using Hidden Markov Models," Proceedings of IEEE International Conference on Acoustics, Speech, and Signal Processing, Phoenix, AZ, 1999, 4 pages.

Kathy Bohrer and Bobby Holland, editors, "Customer Profile Exchange (CPExchange) Specification," Oct. 20, 2000, Version 1.0, International digital Enterprise Alliance, Inc. (IDEAlliance), pp. 1-127.

Jane Hunter (DSTC Pty Ltd), Editor, "DDL Working Draft 3.0," ISO/IEC JTC1/SC29/WG11 N3391, MPEG 00/ May 2000 (Geneva), 23 pages.

Vikrant Kobla, et al. "Detection of Slow-Motion Replay Sequences for Identifying Sports Videos," Laboratory for Language and Media Processing, University of Maryland, College Park, MD 20742-3275, USA, 6 pages.

Richard J. Qian, et al. "Description Schemes for Consumer Video Applications," Proposal ID 429, ISO/IEC JTC1/SC29/WG11—MPEG-7 Proposal, Feb. 1999.

Zhu Liu and Qian Huang, "Detecting News Reporting Using Audio/Visual Information," 1999 IEEE, pp. 324-328.

Y Kawai, "Detection of Replay Scenes in Broadcasted Sports Video by focusing on digital Video Effects," IEICE (D-II), vol. J84-D-II, No. 2, pp. 432-435, Feb. 2001, (In Japanese), pp. 432-437.

Vikrant Kobla, et al., "Detection of Slow-Motion Replay Sequences for Identifying Sports Videos," Laboratory for Language and Media Processing, University of Maryland, College Park, MD 20742-3275, USA, pp. 135-140.

H. Pan, et al. "Detection of Slow-Motion Replay Segments in sports Video for Highlights Generation," Proceedings of IEEE International Conference on Acoustics, Speech, and signal Processing, Salt Lake City, UT, 2001, 4 pages.

Alan E Bell, "The dynamic digital disk," IEEE Spectrum, Oct. 1999, pp. 28-35.

Baoxin Li and M. Ibrahim Sezan, "Event Detection and Summarization in Sports Video," Sharp Laboratories of America, 5750 NW Pacific Rim Blvd., Camas, WA 98607, USA, 5 pages.

Minerva Yeung, "Extracting Story Units from Long Programs for Video Browsing and Navigation," Proceedings of Multimedia 1996, 1996 IEEE, pp. 296-304.

Boon-Lock Yeo et al., "On the Extraction of DC Sequence from MPEG Compressed Video," 1995 IEEE, pp. 260-263.

FAP Specifications, MPEG-4 Compliant Facial Animation, http://www.dsp.dist.unige.it/~pok/RESEARCH/MPEG/fapspec.htm, 4 pages.

Frank R. Kschischang, et al., "Factor Graphs and the Sum-Product Algorithm," IEEE Transactions on Information Theory, vol. 47, No. 2, Feb. 2001, pp. 498-519.

John S. Boreczky, et al. "A Hidden Markov Model Framework for Video Segmentation Using Audio and Image Features," Proceedings of IEEE International Conference on Acoustics, Speech, and Signal Processing, Seattle, WA, 1998, 4 pages.

Wayne Wolf, "Hidden Markov Model Parsing of Video Programs," Proceedings of the 1997 IEEE International Conference on Acoustics, Speech, and Signal Processing (ICASSP '97), pp. 2609-2611.

Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.

M. R. Naphade, et al. "A High-Performance Shot Boundary Detection Algorithm Using Multiple Cues," Proceedings of IEEE International Conference on Image Processing, Chicago, IL, 1998, pp. 884-887.

Josh Bernoff, "How Cable TV Can Beat Satellite," WholeView TechStrategy Rsearch, Apr. 2002 Forrester Research, Inc., 400 Technology Square, Cambridge, MA 02139 USA.

Vikrant Kobla, et al., "Identifying sports videos using replay, text, and camera motion features," Laboratory for Language and Media Processing, University of Maryland, College Park, MD 20742-3275, USA, Date Unknown.

B. B. Chaudhuri, et al., "Improved fractal geometry based texture segmentation technique," IEE Proceedings-E, vol. 140, No. 5, Sep. 1993, pp. 233-241.

Toshio Kawashima, et al., "Indexing of Baseball Telecast for Content-based Video Retrieval," Dept. of Information engineering, Hokkaido University, Kita-13, Nishi-8, Sapporo, 060-8628, Japan, 1998 IEEE, pp. 871-874.

Nathaniel J. Thurston, et al. "Intelligent Audience guidance: The New Paradigm in Television Navigation," Predictive Networks, Inc., Feb. 21, 2002, 9 pages.

Dulce Ponceleon, et al. "Key to Effective Video Retrieval: Effective Cataloging and Browsing," ACM Multimedia '98, Bristol, UK, 1998, pp. 99-107.

Henry Lieberman, et al. "Let's Browse: A collaborative Web Browsing Agent," Massachusetts Institute of Technology, 20 Ames Street #E15-305, Cambridge, MA 02139, USA, Copyright ACM 1999, pp. 65-68.

Noboru Babaguchi, et al., "Linking Live and Replay Scenes in Broadcasted Sports Video," ACM Multimedia Workshop, Marina Del Rey, CA, USA, Copyright ACM 2000, pp. 205-208.

Giridharan Iyengar, et al., "Models for automatic classification of video sequences," SPIE vol. 3312, 1997, pp. 216-227.

Nevenka Dimitrova, et al., "Motion Recovery for Video Content Classification," ACM Transactions on Information Systems, vol. 13, No. 4, Oct. 1995, pp. 408-439.

DDL Group, "MPEG-7 Description Definition Language Document V 2," ISO/IEC JTC1/SC29/WG11/N2997, Oct. 1999/Melbourne, 56 pages.

Description Scheme Group, "MPEG-7 Description Schemes (V0.5)," ISO/IEC JTC1/SC29/WG11 N2844, MPEG 99, Jul. 1999, Vancouver, pp. 1-59.

Description Scheme Group, "MPEG-7 Generic AV Description Schemes (V0.7)," MPEG 99, Oct. 1999, Melbourne.

AHG on MPEG? Media/Meta DSs and Harmonization with other Schemes, "MPEG-7 Media/Meta DSs upgrade (V0.2)," ISO/IEC JTC1/SC29/WG11 MXXXX, MPEG 99 Oct. 1999, Melbourne, pp. 1-17.

Peter Van Beek, et al, Editors, "MPEG-7 Multimedia Description Schemes WD (Version 3.0)," ISO/IEC JTC1/SC 29/WG 11/N3411, May 2000, Geneva.

Peter Van Beek, et al., Editors, "MPEG-7 Multimedia Description Schemes XM (Version 3.0)," ISO/IEC JTC1/SC29/WG 11/N3410, May 2000, Geneva.

P. Van Beek et al., "MPEG-7 Requirements for Description of Users," ISO/IEC JTC1/SC29/WG11, MPEG99/4601, Mar. 1999, 5 pages.

F. Pereira, Editor, "MPEG-7 Requirements Document V.9," ISO/IEC JTC1/SC29/WG11/N2859, Jul. 1999/Vancouver (Canada).

Sylvie Jeannin, et al., Editors, "MPEG-7 Visual part of eXperimentation Model Version 6.0," ISO/IEC JTC1/SC29/WG11/N3398, Geneva, Jun. 2000.

Kaushal Kurapati, et al., "A Multi-Agent TV Recommender," Adaptive Systems Department, Philips Research Briarcliff, 345 Scarborough Rd., Briarcliff Manor, NY 10510, USA, Date Unknown.

Jane Hunter (DSTC Pty Ltd.), "Text of ISO/IEC CD 15938-2 Information technology—Multimedia content description interface—Part 2 Description definition language," ISO/IEC JTC1/SC29/WG11 N3702, MPEG 00/3702, Oct. 2000 (La Baule).

(56) References Cited

OTHER PUBLICATIONS

"Information Technology—Multimedia Content Description Interface—Part 5: Multimedia Description Schemes," ISO/IEC JTC 1/SC 29 N 3705, Nov. 17, 2000, ISO/IEC CD 15938-5.

Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.

Yao Wang, et al., "Multimedia Content Analysis," IEEE Signal Processing Magazine, Nov. 2000, pp. 12-35.

Mark T. Maybury, et al., "Multimedia Summaries of Broadcast News," Advanced Information Systems Center, The MITRE Corporation, 202 Burlington Road, Bedford, MA 01730, USA, pp. 442-449.

Shinichi Satoh, et al., "Name-It: Association of Face and Name in Video," School of Computer Science, Carnegie Mellon University, Pittsburgh, PA 15213, Dec. 20, 1996, 19 pages.

Stuart J. Golin, "New metric to detect wipes and other gradual transitions in . . . " Part of the IS&T/SPIE Conference on Visual communications and Image Processing '99, San Jose, CA Jan. 1999, SPIE vol. 3653, pp. 1464-1474.

Ullas Gargi, et al., "Transactions Letters: Performance Characterization of Video-Shot-Change Detection Methods," IEEE Transactions on Circuits and Systems for Video Technology, vol. 10, No. 1, Feb. 2000, 13 pages.

Michael Ehrmantraut, et al., "The Personal Electronic Program guide—Towards the Pre-selection of Individually Programs," 1996 ACM, pp. 243-250.

Marc Light, et al., "Personalized Multimedia Information Access," Communications of the ACM, vol. 45, No. 5, May 2002, pp. 54-59.

Kyoungro Yoon, et al., "Proposal of Usage History DS," ISO/IEC JTC1/SC29/WG11, MPEG00/M6259, Jul. 2000, Beijing.

Michael T. Chan, et al., "Real-Time Lip Tracking and Bimodal Continuous Speech Recognition," Rockwell Science Center, 1049 Camino Dos Rios, Thousand Oaks, CA 91360, 6 pages, date unknown.

Boon-Lock Yeo, et al., "Retrieving and Visualizing Video," Communications of the ACM, Dec. 1997, vol. 40, No. 12, pp. 43-52.

H.B. Lu, et al., "Robust Gradual Scene Change Detection," Proceedings of IEEE International Conference on Image Processing, Kobe, Japan, 1999, 5 pages.

Richard J. Qian, et al., "A Robust Real-Time Face Tracking Algorithm," Sharp Laboratories of America, 5750 N.W. Pacific Rim Blvd., Camas, WA 98607, 1998 IEEE, pp. 131-135.

Lexing Lie, "Segmentation and Event Detection in Soccer Audio," EE 6820 Project, Soccer Audio, May 15, 2001, 9 pages.

Riccardo Leonardi, et al., "Content-Based Multimedia Indexing and Retrieval: Semantic Indexing of Multimedia Documents," IEEE 2002, pp. 44-51.

R. W. Picard, "A Society of Models for Video and Image Libraries," IBM Systems Journal, vol. 35, Nos. 3 & 4, 1996, pp. 292-312.

Alberto Del Bimbo, et al., "A Spatial Logic for Symbolic Description of Image Contents," Journal of Visual Languages and Computing (1994) 5, pp. 267-286.

Jin-Soo Lee, et al. Editors, "Specification of the UsageHistory DS," ISO/IEC JTC 1/SC 29/WG 11/M5748, Mar. 2000, Noordwijkerhout, pp. 1-6.

Lexing Xie, et al., "Structure Analysis of Soccer Video with Hidden Markov Models," Department of Electrical Engineering, Columbia University, New York, NY, 4 pages.

Selim Aksoy, et al., "Textural Features for Image Database Retrieval," Intelligent Systems Laboratory, Department of Electrical Engineering, University of Washington, Seattle, WA 98195-2500, 5 pages.

B.S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol. PAMI-2, No. 3, May 1980, pp. 204-222.

Noboru Babaguchi, "Towards Abstracting Sports Video by Highlights," ISIR, Osaka University, Ibaraki, Osaka 567-0047, Japan, 2000 IEEE, pp. 1519-1522.

Stephen S. Intille, "Tracking Using a Local Closed-World Assumption: Tracking in the Football Domain," MIT Media Lab Perceptual computing group Technical Report No. 296, pp. 1-62.

Lawrence R. Rabiner, "A Tutorial on Hidden Markov Models and Selected Applications in Speech Recognition," Proceedings of the IEEE, vol. 77, No. 2, Feb. 1989, pp. 257-286.

Jim Stroud, "TV Personalization: A Key Component of Interactive TV," The Carmel Group, 2001, 9 pages.

Ted Lewis, "UbiNet: The Ubiquitous Internet Will Be Wireless,"DaimlerChrysler Research & Technology North America, 3 pages, date unknown.

Richard O. Duda et al., "Use of the Hough Transformation to Detect Lines and Curves in Pictures," Communications of the ACM, Jan. 1972, vol. 15, No. 1, pp. 11-15.

"User Preference Descriptions for MPEG-7," ISO/IEC JTC1/SC29/WG11, MPEG 99/MXXXX, Maui, Hawaii, Dec. 1999, pp. 1-18.

Rainer Lienhart, et al., "Video Abstracting," Communications of the ACM, Dec. 1997/ vol. 40, No. 12, pp. 55-62.

Shingo Uchihashi, et al., "Video Manga: Generating Semantically Meaningful Video Summaries,"FX Palo Alto Laboratory, 3400 Hillview Avenue, Palo Alto, CA 94304, USA, pp. 383-392.

Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.

Daniel Dementhon, et al., "Video summarization by Curve Simplification," Language and Media Processing (LAMP), University of Maryland, College Park, MD 20742-3275, 1998 ACM, pp. 211-218.

Chung-Lin Huang, et al., "Video summarization using Hidden Markov Model," Electrical Engineering Department, National Tsing-Hua University, Hsin-Chu, Taiwan, ROC, 2001 IEEE, pp. 473-477.

Ken Masumitsu, et al., "Video Summarization Using Reinforcement Learning in Eigenspace," IBM Research, Tokyo Research Laboratory, 1623-14, Shimotsuruma, Yamato-shi, Kanagawa, Japan, 4 pages.

Yihong Gong, et al., "Video Summarization Using Singular Value Decomposition," C&C Research laboratories, NEc USA, Inc. 110 Rio Robles, San Jose, CA 95134, USA, 2000 IEEE, 7 pages.

Yihong Gong, et al., "Video Summarization with Minimal Visual Content Redundancies," C&C Research Laboratories, NEC USA, Inc., 110 Rio robles, San Jose, CA 95134, USA, 2001 IEEE, pp. 362-365.

Minerva M. Yeung, et al., "Video visualization for Compact Presentation and Fast Browsing of Pictorial Content," IEEE Transactions on circuits and Systems for Video Technology, vol. 7, No. 5, Oct. 1997, pp. 771-785.

Stephen S. Intille, et al., "Visual Tracking Using closed-Worlds,", MIT Media Laboratory Perceptual computing Section Technical Report No. 294, Nov. 1994, pp. 1-18.

Leszek Cieplinski, et al. "Visual Working Draft 3.0," ISO/IEC JTC1/SC29/WG11/N3399, Jun. 2000 (Geneva), 92 pages.

Sunghoon Choi, et al., "Where are the ball and players?: Soccer Game Analysis with Color-based Tracking and Image Mosaick," Dept. of EE, Pohang University of Science and Technology, San 31 Hyoja Dong, Pohang, 790-784, Republic of Korea, pp. 1-15.

http://web.archive.org/web/20001017172449/http://www.pvi-inc.com/.

David Beech, et al., editors, "XML Schema Part 1: Structures," http://www.w3.org/1999/05/06-xmlschema-1/, W3C Working Draft, May 6, 1999, 67 pages.

Paul V. Birch, et al., editors, "XML Schema Part 2: Datatypes, World Wide Web Consortium Working Draft," May 6, 1999, http://www.w3.org/1999/05/06-xmlschema-2/, 37 pages.

Japanese Office Action dated Jan. 12, 2010 for Japanese Patent Application No. 2007-053473.

European Search Report, mailed Nov. 30, 2011, European Patent App. No. 07004372.4-1247, Sharp Kabushiki Kaisha, 3 pgs.

\* cited by examiner

METHOD AND SYSTEM FOR CONFIGURING MEDIA-PLAYING SETS

CROSS-REFERENCE TO RELATED APPLICATIONS

Not applicable.

BACKGROUND OF THE INVENTION

The present invention relates to a method and system for helping end users configure their respective media-playing sets and is particularly applicable to helping consumers set up, maintain, and view audiovisual equipment such as televisions.

Over time, as consumer electronics equipment has become increasingly rich with features, and particularly so with higher-end models, users are experiencing greater difficulty configuring their equipment. Although well-written instructions, printed or stored on playable media, may suffice for some, most users become frustrated if they are required to search through many pages to find what they need, and new features provided by the manufacturer can be easily overlooked.

To provide consumers with another place they can turn to for help, many manufacturers offer some alternative form of customer support. One of the simpler types is simply a collection of web pages devoted to support issues that the user might have. Such sites may simply post the same or expanded content as that found in the instructions, thus posing the same or even greater disadvantages as those already described. In some instances, the consumer can ask questions or otherwise interact with the site by email; however, the user may lack the information needed to frame the question properly and may become discouraged after waiting for and receiving an unhelpful reply.

To afford greater interactivity with and responsiveness to the consumer, some manufacturers rely on a customer service call center. Here the user can call in and speak with a representative who has received specialized training on the manufacturer's products. Unfortunately, the cost of maintaining a call center can be prohibitive and tends to increase as products become more complex and as users accordingly require more support. It will be appreciated that reducing the number and duration of calls can result in significant cost savings.

Although, from the standpoint of the consumer, speaking with a live representative is normally preferable to other options, there can be obstacles even in this context to providing high quality support. For example, the consumer may have difficulty describing the nature of their issue, particularly if the issue involves a matter of degree, such as a particular color or noise condition, or if, instead of poor or inoperable performance, the issue relates to a subjective preference of the user. Moreover, due to unfamiliarity with the various components of the equipment, the user may have difficulty implementing the solution proposed by the live representative.

To some extent, customer confusion can be reduced by focusing on user-friendliness during the original design stage and by testing products for "usability" prior to commercial rollout. On the other hand, it can be hard to determine those features which the consumer finds of greatest value and hence where to make appropriate tradeoffs between feature richness and ease of use. One traditional approach to assessing consumer preferences is to enclose a survey card with the product, but often the consumer simply discards the card.

Some manufacturers, in certain cases to avoid the difficulties noted above, build their equipment with as many default settings as possible and, when a choice must be made, dictate this choice, as through the use of remote content-switching facilities. Normally, the main source of income for such companies is not from sales to consumers but rather from sales to providers who pay to have selected content, such as advertising, pushed to the consumer. In like fashion, some manufacturers generate the bulk of their income from marketing companies and thus design "surveillance" features into their equipment to surreptitiously gather information about the consumer that can include consumer preferences and sometimes product performance. Other manufacturers rely for product support on periodic updates that automatically install undetected by the user. Such approaches, however, are not entirely consistent with a longer-range objective of educating and informing consumers regarding product features so that, for example, they develop sufficient sophistication, over time, to fully appreciate the manufacturer's higher-end product offerings.

One approach to optimizing a consumer's viewing experience that has been widely adopted by the television industry in particular is the Electronic Programming Guide (EPG). Television signals, in addition to carrying the necessary video and audio information for each televised program, normally contain metadata (or data about data) for each program. This metadata can include the program's source (e.g., channel number), date and time of transmission, program duration, a representative still frame, and a capsule summary of the program's theme, principal actors, director, or other content-related information.

In televisions of more recent vintage, a mechanism is provided for decoding the EPG information and selectively displaying it on-screen to assist the user in making a suitable channel selection. However, the large number of channels to choose from may discourage the user from reviewing each EPG summary in order to find a suitable program, particularly as this number approaches or exceeds over one-hundred different channels as in many cable, community TV, or satellite systems. In similar manner, some manufacturers offer on-screen guides that the user may follow in setting up or maintaining their set. However, the user can become frustrated by the number of separate choices or selections the user may need to make or the number of different screens the user must proceed through to accomplish a particular setup or maintenance objective. This is especially true when, as is commonly the case, the user at some point is asked to decide between two equally plausible choices or if the user goes through the entire process only to reach a dead-end due to a wrong selection made earlier.

BRIEF SUMMARY OF THE INVENTION

Based on the foregoing, then, it is an object of the present invention to provide an improved method and system for helping users configure their respective media-playing sets so as to provide an enhanced support experience to each user.

In accordance, then, with a first aspect of the present invention, such a method is provided including maintaining a support site, detecting status information about a set remotely from the site including internally collecting information about an intrinsic broadcast characteristic of the set having potential settings selectable by the user, and remotely specifying a preferred one of the settings from the site based on such status information. Consistent with this approach, a remote site aligned with customer service can specify a suitable setting to resolve a user's issue while taking full advantage of information available from the set itself and while preserving the capacity of each user to independently exercise control over such extended features as can desirably be made available for local control by the user.

In accordance with a related second aspect of the present invention, a method is provided including maintaining a support site, detecting status information about a set remotely from the site in response to a request for help from the user including internally collecting information about a user-adjustable component of the set for selecting an on-screen characteristic, and remotely adjusting the component from the site based on such status information. Under this procedure, in the context of video-playing equipment, the support site is able to flexibly respond to a user's request for help in an effective and efficient manner even where language barriers or other impediments to communication are present while, at the same time, having initiated the contact, the user is kept fully apprised of adjustments being made to the set.

In accordance with a related third aspect of the present invention, a method is provided including maintaining a support site, detecting status information about a set remotely from the site including internally collecting information about a broadcast characteristic of the set having potential settings initially selectable by the user, and remotely specifying initially a selected one of the potential settings from the site based on such status information. By use of this method, a remote customer service site ensures that effective assistance is provided to the user in a timely fashion so as to avoid, for example, initial frustration of the user with their newly purchased set.

In accordance with a related fourth aspect of the present invention, a method is provided including maintaining a support site, detecting status information about a set remotely from the site including internally collecting information about at least two broadcast characteristics of the set having potential settings selectable by the user, and remotely specifying from the site a preferred setting for each of the characteristics. Relying on this approach, a remote customer support site can specify settings conducive to enhancing the user's broadcast experience and, in particular, by ensuring each setting is optimized for the other, the support function efficiently presents to the user, in one package so to speak, a readily comprehensible "complete" solution comprised of more than one potential setting.

In accordance with a related fifth aspect of the present invention, a system is provided comprising a support site connectable electronically with and remotely situated from each set where each set has an intrinsic broadcast characteristic including potential settings selectable by the user and the site has a detector adapted to internally collect information from each set including status information about the characteristic and further has a server enabling specification of a preferred one of the settings based on the status information. Consistent with this approach, a remote site having, for example, cost-effective access to centralized resources dedicated to customer service, specifies a suitable setting to resolve a user's issue even where communication barriers exist while, at the same time, the user retains the capacity to independently control fully the broadcast characteristics of the set.

In accordance with a sixth aspect of the present invention, a method is provided including maintaining a support site, prompting a user to specify at least one of a plurality of selections available for the set in a setup context including eliciting the selection so as to enable the user to respond by operating a remote control device independently of performing any on-screen menu scrolling operation, and then completing setup by automatically specifying at the site additional selections and remotely configuring each set in accordance with such automatically-specified and user-specified selections. Under this approach, a remote support site can effectively assist a user in setting up their equipment insofar as appropriate selections are automatically made for configuring the set based on minimal input by the user and in such a manner that avoids requiring the user to inefficiently scroll through irrelevant menu screens and selections.

In accordance with a seventh aspect of the present invention, a method is provided including maintaining a support site, prompting a user to specify at least one of a plurality of selections available for the set in a setup context including eliciting the selection free of any listing of any other mutually exclusive selections, and then completing setup by automatically specifying at the site additional selections and remotely configuring each set in accordance with such automatically-specified and user-specified selections. Through this method, users can receive automated and cost-effective help in configuring their respective sets without proceeding through multiple screens in which they are forced, as they go along, to choose between equally plausible choices and then forced, at the end, to repeat the entire process if they earlier made an incorrect selection.

In accordance with an eighth aspect of the present invention, a method is provided including maintaining a support site, remotely providing at the set from the site a listing of possible outcomes for a feature category including at least one broadcast characteristic of the set, each characteristic having potential settings selectable by the user, enabling the user to identify a targeted one of the outcomes, and remotely specifying a preferred one of the settings for resolving the targeted one of the outcomes. By this method, users are enabled to relate their concerns in an effective fashion to the customer support function even where they are having difficulty in merely formulating the general nature of their concerns.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

I. Remote Presence

Figure 1:
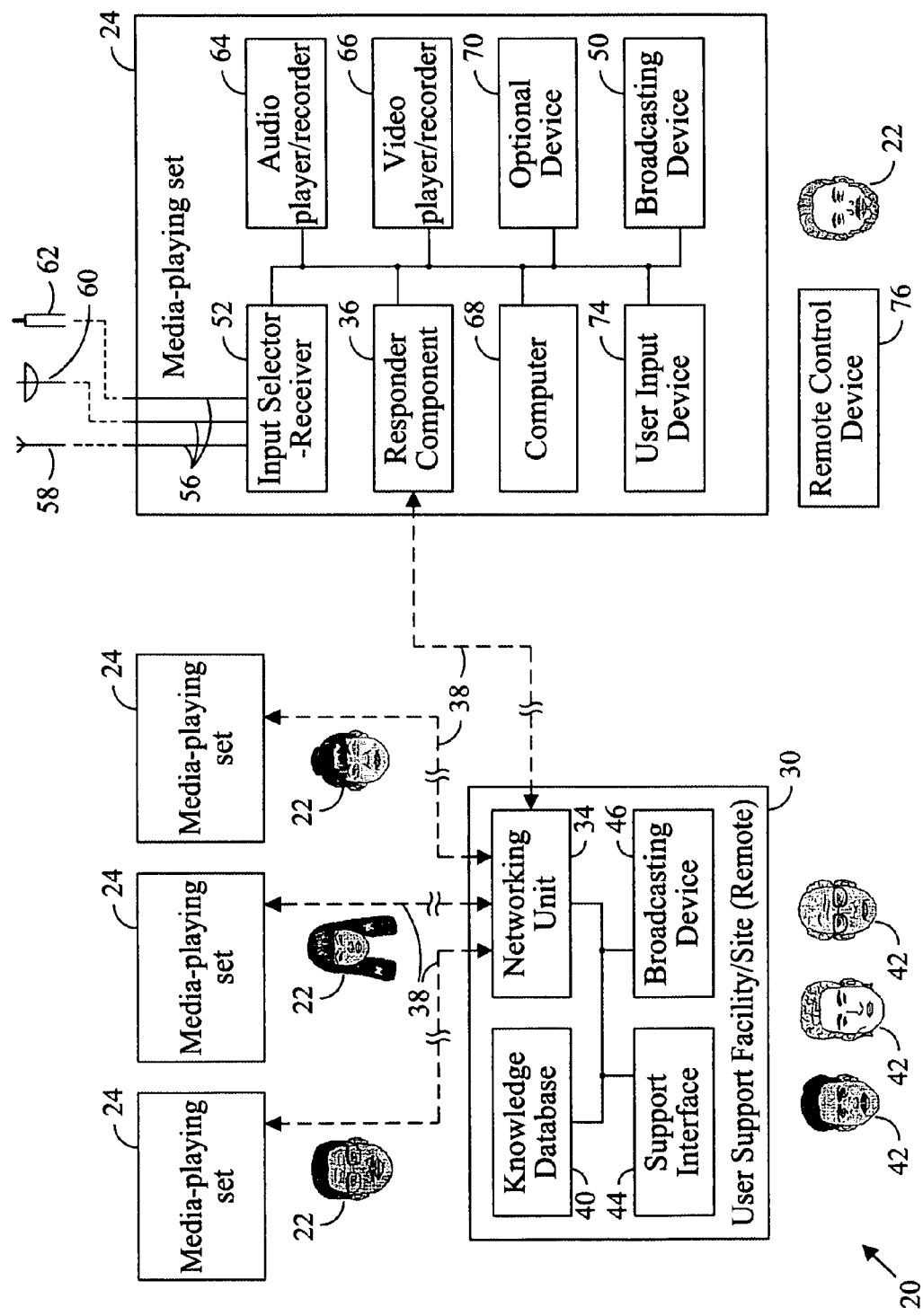
FIG. 1 is a diagrammatic view representing an exemplary system for configuring media-playing sets as constructed in accordance with the present invention.

FIG. 1 shows an exemplary system 20 designed to help end users 22 configure their respective consumer video or media-playing sets 24. These users, as indicated, can be widely distributed at separate locations geographically. The present invention has particular applicability to providing an exemplary customer support function where the users constitute consumers and the sets represent various consumer entertainment devices.

In accordance with the invention, a user support site or facility 30 is provided centrally located remotely from the sets 24. The term "remotely," as used herein and in the claims, is intended to signify relative inaccessibility, from the standpoint of convenient access, in relation to the particular household or quarters where the user 22 of the set is located. Hence, by means of the support site, a "remote presence" is maintained for supporting the customer.

The remote site 30 includes a networking unit 34 designed to interactively communicate electronically with a responder component 36 provided in each set 24 so that, as described more specifically below, status information about the intrinsic broadcast characteristics of each set can be internally collected remotely and each set controlled or driven so as to enable specification or selection of preferred settings for these characteristics. This function is preferably performed over broadband lines 38 using secure communication technology to avoid inadvertent sharing of sensitive user information over the network. For the exemplary system shown, Secure Socket Layers (SSL) is the exemplary method used to establish secure connections, although various connection technologies can be used including cable, asymmetrical digital subscriber line (ADSL), integrated digital services network (ISDN), "plain old" telephone service (POTS), and so on. It will be noted that this line can be intermittently established as needed and is not required to be a dedicated line, as indicated by the broken section shown, thereby freeing up network resources and minimizing maintenance costs.

The support site 30 preferably includes a knowledge database 40 providing recorded information usable by the networking unit 34 in responding to user requests for help. An individual account is established for each user 22 starting with their initial service contact to allow the individual broadcast preferences of each user to be recorded in the database. This data can then be analyzed, as further described below, by the networking unit either individually or for related categories of grouped users in order to enhance the service response given. Knowledge provided by outside experts having specialized expertise in setting up, diagnosing, tuning, or maximizing viewer broadcast enjoyment is also preferably recorded in the database.

In the system depicted in FIG. 1, the support facility or site 30 is staffed by customer service representatives 42 who interact with the networking unit 34 through a support interface 44 including, for example, data entry terminals to allow the representatives to enter any information desired during a support session. Where the facility is so staffed, preferably a broadcasting device 46 is provided for use by these representatives that replicates the local broadcast made at the respective sets of the users being helped. For example, if the media-playing set 24 is a television having a local broadcasting device 50 constituting a television screen and speaker bank, then the remote broadcasting device 50 likewise constitutes a television screen and speaker bank so configured that the representative can see and hear the audiovisual content experienced by the user. This allows the representative to quickly ascertain what is happening with the user's set and to authorize or make changes even where the user is having difficulties describing specifically the nature of the broadcast characteristics he or she is concerned about.

Although FIG. 1 shows the support site 30 staffed by representatives 42, it will be noted that this is only one possible type of configuration for the system 20. In accordance with an alternative preferred embodiment of the invention, the support site operates fully automatically during each support session without the assistance or intervention of any representative. This latter approach has the advantage of minimizing staffing costs, which normally represent a sizable percentage of the costs of maintaining a support center.

In FIG. 1, the media-playing set 24 is depicted in schematic fashion to indicate the various types of functional components that may compose the set. An input selector-receiver 52 preferably enables the user 22 to select between different types of input sources or signals. The input selector-receiver is configured so as to be capable not only of demodulating or processing each different type of signal but also, in the case of a multiplexed broadcast, to enable the user to tune to a particular channel or station and to extract any metadata contained in the broadcast as described in the Background section.

In the embodiment of FIG. 1, the input selector-receiver 52 is selectively adjusted to select one of the input lines 56 that delivers a particular type of external signal, such as from a broadcast television reception antenna 58, satellite television dish antenna 60, or cable television access link 62, respectively. The input selector-receiver can also be selectively adjusted to select and process an internal signal such as derived from a compact disc (CD) playing on an audio player/recorder 64, a digital video disc (DVD) playing on a video player/recorder 66, a game playing on a computer 68, or some other media playing on some other type of optional device 70.

The broadcasting device 50 is the output device directly conveying the programming content to the user 22. If the media-playing set 24 is a stereo system, for example, this device could be a speaker, or if the set is a computer or television that is broadcasting dynamic pictures and sound, this device could be a display screen and speaker bank. To enable the user to select a particular input source, input channel, and particular picture or sound characteristics, the set further includes a user input device 74, such as a keyboard, keypad, or bank of depressible buttons, and preferably a remote control device 76, such as of the exemplary type further described below. It will be recognized that the configuration depicted in FIG. 1 is representative only and that the functional components could be combined or divided differently than shown or that individual components can be added to or subtracted from the set without necessarily departing from the broader aspects of the present system.

Key components of the user support facility 30 and media-playing sets 24 include the networking unit 34 and the responder component 36, respectively. Details of the preferred functional aspects of these two components are further shown in FIG. 2. As noted above, the present invention has particular applicability to the field of televisions. In the exemplary embodiment shown in FIG. 2, the media-playing set 24 is a digital television 100 including a data processor and memory 102. The functions of the input selector-receiver 52 of FIG. 1 are performed in FIG. 2 by the input source and channel selector 104, the signal processor 106 for processing video and audio components, and that part of the data processor and memory 102 responsible for metadata processing. As in FIG. 1, the digital television includes input lines 56 for receiving external broadcast signals, a user input interface 108 by which the user can make adjustments at the set, such as a bank of depressible buttons, and a remote control device 110, the exemplary design of which is described below. A display screen and speakers 112 constitute the output device for directly conveying the broadcast content to the user.

Consistent with the object of developing in the user an appreciation for higher-end models having more advanced features, all important features of the set 100 are desirably accessible for local adjustment by the user either by means of the user interface 108 or the remote control device 110. As a preliminary point, it will be seen that the internal components of the television 100 are interconnected through a data bus 114 so that each component can exchange data or other information with every other component, if necessary through the mediation of the data processor 102. Using, the buttons on the input interface, for example, the user can adjust the input source and channel selector 104 to switch to or select a particular input source, say a satellite TV feed, among those supplied through input lines 56, and also a particular channel, say channel 49, among the multiple channels contained in the multiplexed satellite signal. The signal processor 106 adjusts automatically for demodulating and processing the video and audio components of whichever type of signal is selected.

In addition to input source and channel selection, the user can also adjust or select various individual setup features of the exemplary television set 100. These features normally will include a parental control setting that can selectively be enabled or disabled to lock or unlock, respectively, the television set so that children in the household cannot indiscriminately view inappropriate programming in the user's absence. Other setup features desirably accessible for user selection include a closed captioning control for enabling or disabling closed captioning for the hearing impaired, a screen angle control for setting the precise position or angle of the screen relative to the viewer, a picture flip control for flipping the on-screen image one-hundred and eighty degrees, and a language control for setting the default language displayed on-screen, with selections such as English, Spanish, French, Japanese, and so on. As further described below under Roman Numeral heading III, preferably the user can also select an on-screen help option for help with identifying a general problem or concern and targeting a particular broadcast outcome for resolution of that concern.

In addition to viewing (source and channel) and setup selections, the user can moreover individually select or adjust various picture and audio settings of the exemplary television set 100. These selections can be made either directly at the set through pressing buttons at interface 108 or indirectly through the remote control device 110; in either event, the desired adjustment is sent to the operational setting selector 116, which internally performs the function of adjusting these operational settings to their desired values. Picture controls accessible for user adjustment include brightness, backlight, color, contrast, tint, and sharpness, each of which can be selectively varied by the user within a range of different values. Additionally, an on-screen picture control (OPC) is provided to precisely adjust the x-y axis positioning of the picture image on the screen. Audio controls accessible for user adjustment include treble, bass, balance, digital noise reduction, and audio only output. Though not further discussed below, power control settings can also be included, for example, an energy-saving or sleep control that can selectively be enabled or disabled to conserve energy.

It will be recognized that each of the potential selections identified in the last three paragraphs change or affect "intrinsic broadcast characteristics" of the set as this phrase is used herein and in the claims. By itself, the term "broadcast characteristic" merely implies a characteristic (viewing, setup, picture, audio, power, etc.) affecting the broadcast and is broad enough to cover intrinsic characteristics (originating from within the set) or extrinsic characteristics (originating outside the set). Note that the term "intrinsic" is intended to apply even where, as in the present invention, the characteristic is also controllable remotely. On the other hand, the term "extrinsic" would apply where the characteristic is only controllable by an external or remote component even if the user is permitted to adjust the characteristic by request to a remote operator insofar as the user cannot, at the user's discretion, fully exercise control over that characteristic locally. The term "extrinsic" is also intended to apply where the broadcast characteristic (e.g., channel, picture, sound, etc.) changes merely because of a change in external broadcast conditions (such as a setting that automatically changes based on what other users are doing). Other examples of extrinsic characteristics include the viewing time of day or day of week even though these can be set or selected by the user. It will further be recognized that not every selectable characteristic of the set is a "broadcast" characteristic; for example, this phrase does not cover updating of surreptitious monitoring software insofar as such updating or adjustment does not affect any "broadcast" aspect apparent to the user.

In accordance with an exemplary aspect of the present system, the networking unit 34 at the remote site dynamically interacts with the responder component 36 of the set 100 in such a manner as to provide effective assistance to the user in setting up, maintaining, and operating the set with a minimum of difficulty and inconvenience either to the user or the customer support function. The term "component" is used here to refer to any instrumentality whether implemented in hardware, software, or firmware. In particular, in the exemplary embodiment shown in FIG. 2, the networking unit 34 includes a detector 120 having a collector 122 adapted to internally collect information from each set including information about the current status of the intrinsic broadcast characteristics of the set; for example, the current brightness setting, current noise reduction setting, whether the parental control feature is enabled or not, which input source and channel setting is selected; to name just a few examples.

In the paragraph above, the phrase "internally collects" signifies that the information is collected from the set itself, that is, conditions sufficient for remotely collecting the information are established whenever the networking unit 34 and set 100 are interconnected, as by temporary XML internet connection over conventional phone lines, without recourse needed to additional equipment and interconnections.

Depending upon what type of assistance the user seeks and the status information collected, a server 124 preferably acting in conjunction with a processor 126 and the knowledge database 40 (FIG. 1) specifies preferred settings for the set 100. For example, the user may be having difficulty finding a suitable picture setting for the set. The information accumulated or stored in the database can include picture settings previously preferred by that user in a similar viewing context (for example, corresponding to a particular programming category such as action, documentary, sports, and so on) or settings most frequently preferred by other users in a like context, or settings preferred in like context by recognized experts or authorities in the video-imaging field. Using such information, the processor automatically determines the extent of adjustment required (starting from the baseline of the current settings). A software agent 128 included in the server then specifies or conveys these preferred picture settings to the set. In this manner, the user can fully utilize the superior computing resources available at the remote site 30 and these resources, being centralized, can readily be updated with the latest information. At the same time, network overload at the remote site, such as can occur by overreliance on direct dialogue for information collection, is avoided, and the capacity of the user to independently control fully the broadcast characteristics of the set is preserved.

In the example just given, the preferred picture setting that is specified desirably represents a "complete" solution. That is, in accordance with one aspect of the system, the preferred value of backlight, contrast, brightness, color, tint, and sharpness are each determined for the given viewing context or programming category so that all of these separate broadcast characteristics, which together comprise the general category of picture setting, can be simultaneously specified and optimized.

Figure 2:
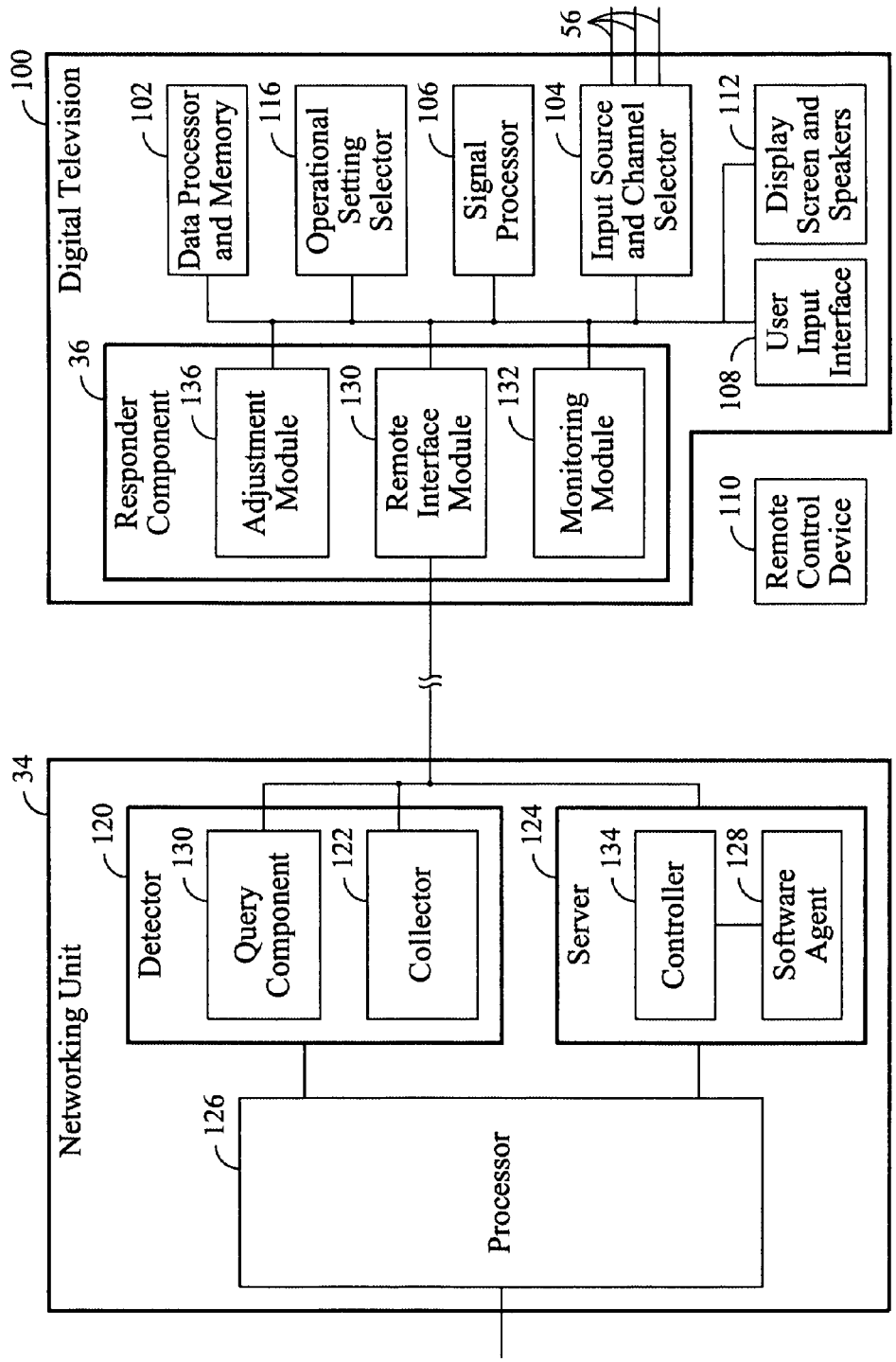
FIG. 2 is a diagrammatic view showing details of the exemplary system of FIG. 1 where, in particular, the broadcasting device is a television set and including details of significant components of the remote site and this set provided in accordance with the present invention.

In the exemplary embodiment shown in FIG. 2, the detector 120 includes a query component 130 that transmits a "query" signal to the set 100 to trigger the sending back of status information by the set to the collector 122. This request to send information can, alternatively, be initiated locally such as by a scripting program stored on a disc readable by the set during the initial setup process or by code prestored in a nonvolatile section of memory 102 and triggered by on-screen selection. A remote interface module 130 is configured to pass instructions between the local set and the remote networking unit 34. This interface module delivers the query request to a monitoring module 132. The monitoring module retrieves information about the current settings at the input source and channel selector 104 and operational setting selector 116 and conveys this information back to the remote interface module for transmission to the remote collector.

At the direction of the remote processor 126, the query component 130 can also transmit a "start self-diagnostic" signal. This signal, transmitted to the data processor and memory 102, causes the set to run a self-diagnosis program testing the full range of operation of the internal components of the set with the results transmitted back to the remote collector 122 for analysis.

In the exemplary embodiment shown in FIG. 2, the server 124 includes a controller 134. This controller enables the respective components of the set 100 to be remotely adjusted internally or "driven" by the networking unit 34. Thus, after the preferred settings for the set have been determined by the processor 126 based on the set's current status, the "control signals" generated by the controller are passed by the remote interface module 130 to the adjustment module 136. The adjustment module, in turn, adjusts the operational setting selector 116 and input source and channel selector 104 in order to select the preferred settings. Hence, without further direction or effort on the part of the user, the user is immediately presented with the preferred settings which have been remotely determined using the support center's extensive resources.

It will be recognized that the functional capabilities diagrammed in FIG. 2 are so shown for ease of illustration and description and that the functional components depicted can be combined or divided differently and certain components added or subtracted while still manifesting the broader aspects of the present system. Further design implementation of the components shown and described lies within the skill of those of ordinary skill in the art of televisions and other consumer electronic sets.

Figure 3:
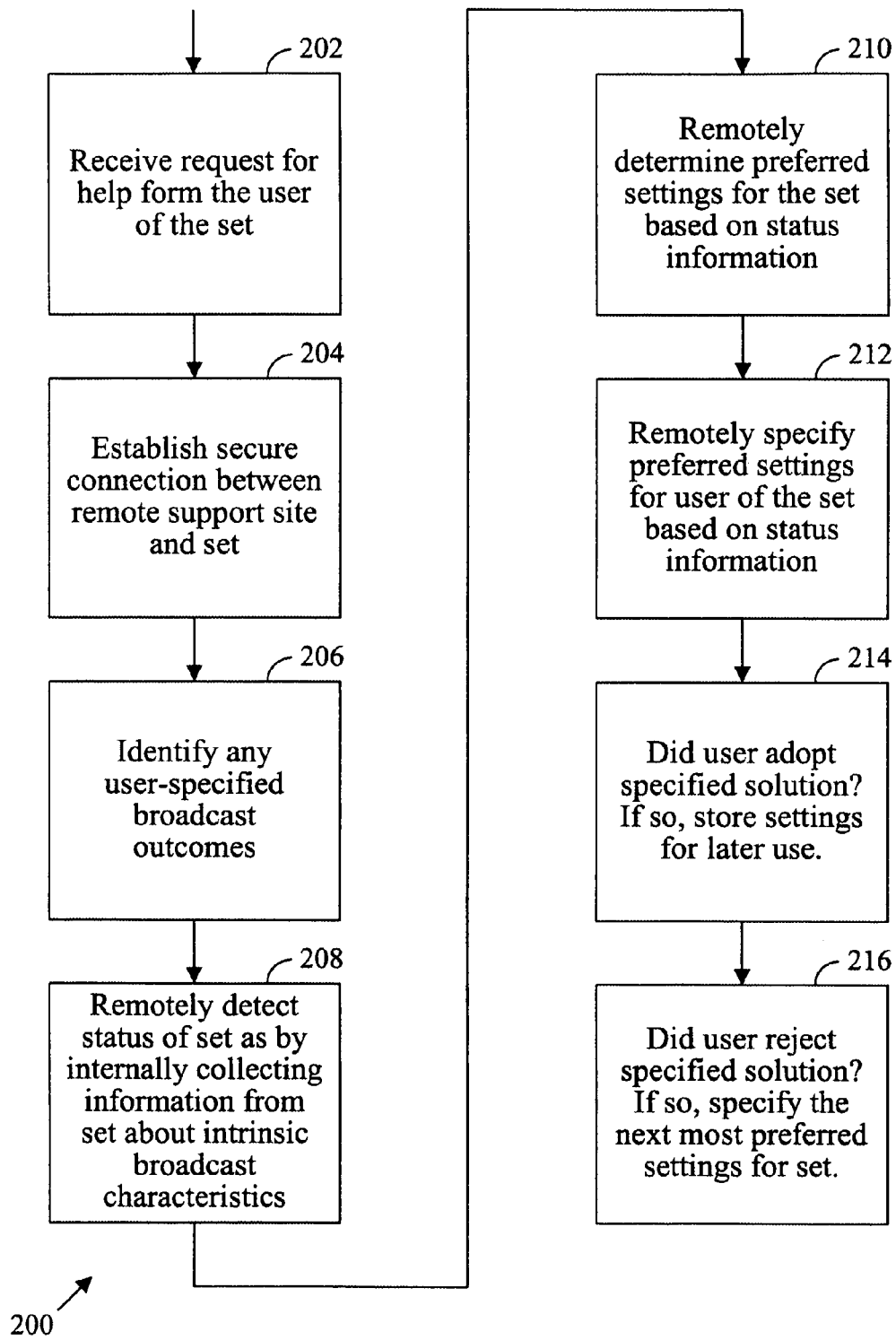
FIG. 3 is a block diagram of an exemplary procedure for configuring media-playing sets, such as of the types shown in FIGS. 1-2, as provided in accordance with the present invention.

FIG. 3 outlines an exemplary method 200 for helping users configure their respective sets. In this method, it is assumed that a remote support site is being maintained for supporting the users such as the facility or site 30 in FIG. 1. It will be noted, at the outset, that no significance is necessarily intended by the particular ordering of the steps listed unless otherwise specified.

In the exemplary method of FIG. 3, step 202 involves receiving the request for help from the user of the set. For example, where the remote site is staffed by customer support representatives 42 (FIG. 1), the user can be given a toll-free support number to call. Alternatively, the support site can be desirably configured to operate entirely automatically. In this latter situation, a disc or other readable media can be provided for the user to insert into the set during setup. A scripting routine on the disc can, among other functions, automatically establish a connection between the local set and remote site using a household telephone or cable line. Or, the user can operate a "Call Outside Help" button on the user input interface 108 (FIG. 2) or remote control device (e.g., item 203 in FIG. 4) which initiates a prestored routine for establishing the connection. Consistent with this step, the user is kept fully apprised of and remains an active partner in making preferred adjustments to the set.

Step 204 of the exemplary method 200 involves establishing a secure connection between the remote support site and set. Preferably this is done using secure sockets layer (SSL) technology to conform to widely adopted standards though other security methods can be used. This prevents inadvertent sharing of sensitive information between users, such as the type of programming a particular user prefers to watch.

Step 206 requires identifying any user-specified broadcast outcomes. This step will be further described below under Roman Numeral heading III where it is explained how the user can enter an optional help mode to help identify a general area of concern and then target a specific broadcast outcome for resolution.

Step 208 involves remotely detecting the status of the set including by internally collecting information from the set about the intrinsic broadcast characteristics of the set. This status information desirably encompasses viewing selections already made such as the input source or channel selected. It desirably encompasses setup selections already made, such as the current setting for the parental control, closed-captioning control, and so on. It desirably encompasses any diagnostic information which, as noted above, is collected from a self-diagnostic program that is invoked to run on the set. It desirably encompasses any operational selections already made such as relate to picture or audio. The meaning of the phrases "internally collecting" and "intrinsic characteristic" is defined more fully above. These characteristics, in accordance with the invention, have settings that are selectable, in the first instance, by the user, should the user so desire. In this manner, full advantage is taken of the information available from the set itself while preserving the capacity of each user to independently control their set's features. In particular, protracted dialogue with the user concerning what the set is doing is avoided.

Although the user can potentially select initially each significant broadcast characteristic of the set, if the user hasn't actually yet made an initial selection for any particular broadcast characteristic, then the exemplary system 20 described above desirably "fills this void" by remotely specifying initially a selected one of the potential settings available for that characteristic. Thus, during initial setup, the user may have failed to select the initial channel and to adjust the brightness and treble. Based on whatever information the user has provided, such as their zip code, and based as well on the preexisting settings detected for the set and also information contained in the knowledge database 40 (FIG. 1), the system can systematically identify selected or "preferred" settings. For example, the processor 126 can identify that channel most commonly preferred for that day-of-week and time-of-day by other users in that or an equivalent zip code area. The processor can further identify those brightness and treble settings most commonly preferred for the corresponding channel category, and hence initially specify systematically selected ones of each of the individual settings not initially specified by the user. These settings, it will be noted, are not only systematically selected but are also dynamically refreshed as the knowledge database is continually updated with the latest information. It will further be noted, in accordance with this approach, that resolution of potential issues is made at the earliest possible opportunity, that is, during initial setup or before the user has encountered any specific difficulties, thereby avoiding any buildup of frustration and disenchantment on the part of the user.

Step 210 involves remotely determining or identifying preferred settings for the set based on the status information collected. This operation, as described above, is desirably performed entirely automatically by the processor 126 (FIG. 2) using information recorded in the knowledge database 40 (FIG. 1). Alternatively, customer service representatives 42 at the remote site can manually make this determination referring, as needed, to the broadcasting device 46 which replicates the pictures and sounds broadcast locally at the set. Furthermore, even in automatic operation, various approaches can be used. For example, the processor can compare the status information detected to factory setting information stored in the database in preparation for resetting the broadcast characteristics to these factory settings. Or, the preferred settings can be determined by looking up information recorded in the database representing those settings recommended by experts in a similar viewing context. Preferably, however, the preferred settings are initially determined, as indicated above, by analyzing historical information recorded in the database during service contacts by other users and identifying those settings most frequently preferred by users in a similar viewing context.

Step 212 involves remotely specifying or providing these preferred settings for local use by the user of the set based, as described above, on the status information collected. In accordance with one aspect of the present system, these settings, in turn, preferably relate to plural broadcast characteristics. Thus, for example, the software agent 128 included in the remote server 124 would specify not only a preferred channel setting but also a preferred picture setting (itself composed of multiple characteristics including brightness, color, tint, etc.) optimized for that particular channel setting (or, more precisely, for the channel category to which that channel setting belongs as further explained under heading II below). Again, desirably these settings are accessible for potential selection by the user, if the user so chooses, and the settings can be specified or provided to the user in an on-screen or audio tutorial in an appropriate situation as where the settings are to be frequently adjusted by the user so that user education is an overriding goal. Normally, however, it is preferable that the remote site internally adjust the set directly, such as by interaction of the controller 134 and adjustment module 136, thereby providing a readily comprehensible "complete solution" to the user in a highly efficient manner. The specifying step can also involve upgrading the software components regulating the operation of the set.

Steps 214 and 216 both involve determining if the user has adopted the preferred settings that were remotely specified. If so, per step 214, the setting is stored, such as in knowledge database 40 (FIG. 1) so that it can be recalled for later use as a preferred setting. It can become part of a profile of preferred settings individually established for each household or can be aggregated with other such profiles as adopted by other households in the same or equivalent viewing contexts to form a particular community profile.

Another significant advantage to recording the adopted settings is that they can be analyzed by the set's manufacturer to establish relative values for the various product features. This, in turn, permits the manufacturer to make better informed design and promotion decisions. Conventional methods to capture this valuable information have generally proven to be expensive and unreliable such as relying on phone surveys or including survey cards with the product, which cards consumers have tended to quickly dispose of rather than completing and returning them.

To indicate whether the settings specified remotely were adopted or not by the individual user, preferably a second status check is made by the monitoring module 132 (FIG. 2) shortly after the specified settings are received to determine if these specified settings have now been selected by the user or, if the selection was initially driven remotely, to determine whether the user has now changed the settings to something else. Depending on the result, either an "adopted" or "rejected" signal is sent by the remote interface module 130 to the remote site. Also, the user can be provided with a "thumbs up" or "thumbs down" button on the user input interface 108 and remote control device 110 to selectively indicate explicitly his or her approval or disapproval of a specified or automatically selected solution.

Per step 216, if the specified settings are rejected, then the next or second most preferred settings are then specified and, if desired, the set is remotely driven so as to automatically adjust the set and provide these particular settings. These settings can represent, for example, the second most frequently chosen settings selected by other users in a similar viewing context. This step, it will be noted, can be repeated as many times as needed until the user is satisfied with the solution specified.

Some of the applications for which the present invention is particularly suited include off-site device setup, off-site device diagnostics, and off-site device data mining. In relation to manual setup assistance, the customer service representative, who is much more proficient at operating the set than the user, can remotely drive the set's menus, access all the set's features, and remotely configure the set, as needed. All the while, the representative can observe the same broadcast characteristics (including picture and sound) as the user and does not have to try overcoming significant communication barriers such as attempting to explain to a confused user how to make specific adjustments to implement a desired solution. In relation to automated setup assistance, the user interacts with a relatively less expensive software agent capable of providing appropriate solutions efficiently and effectively with minimal input required from the user. This agent, moreover, has access to a dynamic knowledge base that is continuously expanding with the latest information about the best available solutions.

In relation to device diagnostics, the set's current settings can be conveniently read remotely, and all factory settings can be reviewed, reset, and altered, as needed. The set can be remotely adjusted to restore it to a known good state and a self-diagnostic program internal to the set can be remotely initiated to test the full range of operation of the set's components, with the results being remotely analyzed to permit a decision on whether the set needs to be returned or, instead, fixed remotely. This diagnostic information can also be of value in designing higher quality sets.

In relation to data mining, using the secure connection, the manufacturer can retrieve the set's usage history stored in the set's on-board memory to determine which features the user found most valuable and which were used but rarely. This, in turn, can help the manufacturer design future sets with improved overall product usability and to set a pricing structure that closely reflects the value of various product features as perceived by users.

Other uses for the remote presence invention which is herein described are possible and can include, in greater or lesser accordance with particular inventive aspects, making firmware upgrades, conveying targeted marketing based on usage patterns, and adding new product features. Two further extensions of the invention will now be described below under separate Roman Numeral heading.

II. Menu-Free Remote Control

Figure 4A:
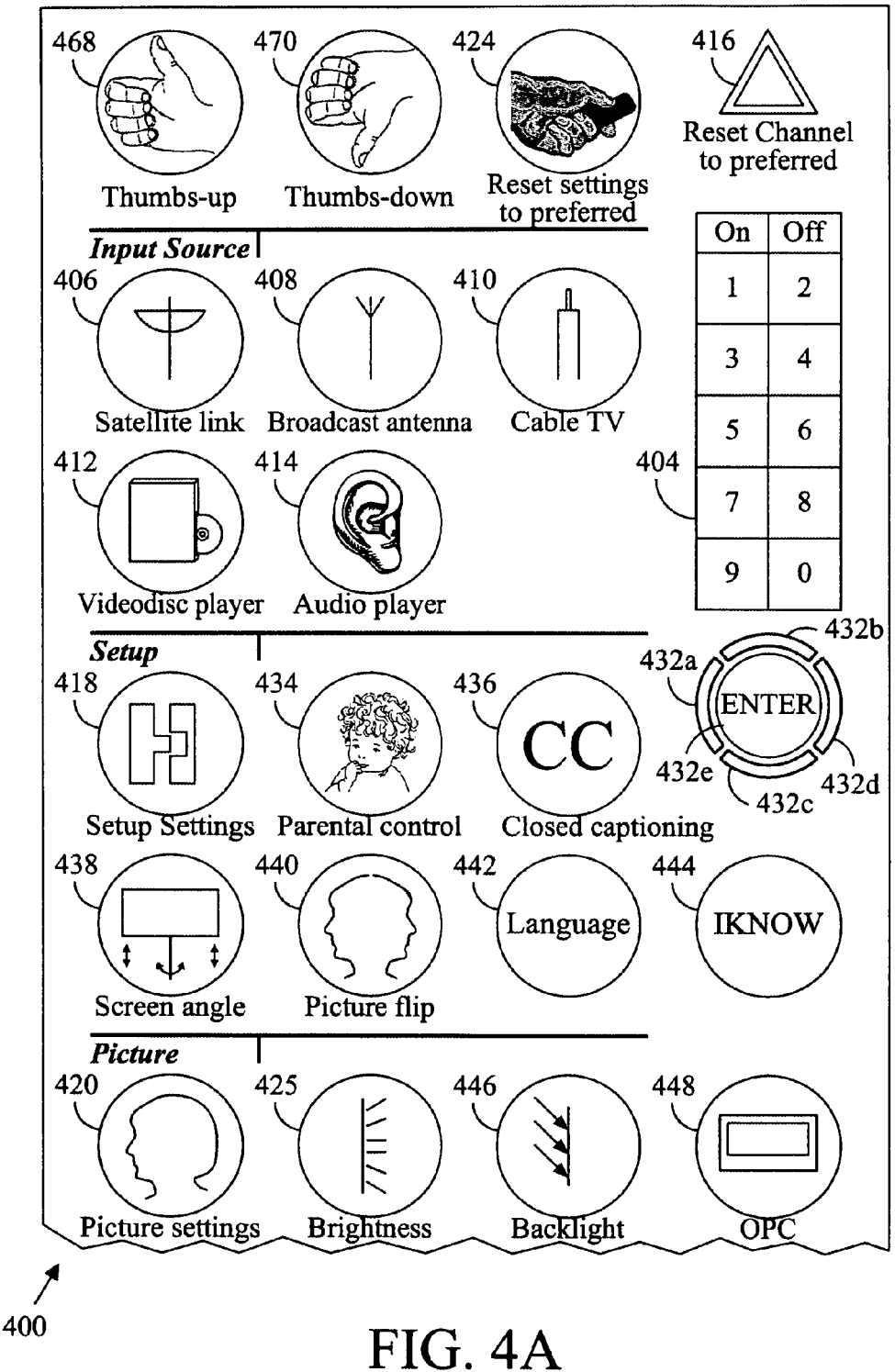
FIG. 4 depicts a remote control device for use with a set as depicted in FIGS. 1 and 2 as constructed and operated in accordance with an exemplary aspect of the present invention.
Figure 4B:
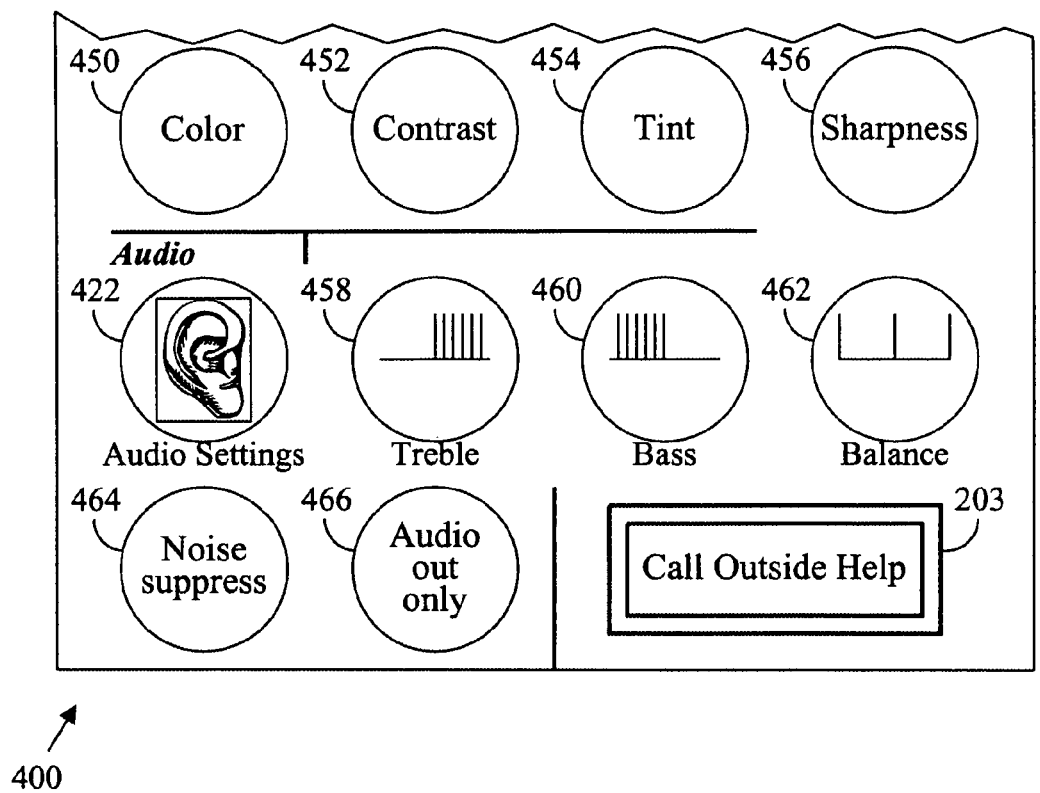

FIG. 4 depicts a remote control device 400 for controlling a media-playing set 24 or 100 as depicted in FIG. 1 or 2, respectively. This device provides improved ease in adjusting the set. In particular, using this device, the user can conveniently make setup, operational, and viewing adjustments without the user having to make confusing on-screen menu choices on multiple screens. Accordingly, the user avoids false starts, dead ends, and restarts where the user is forced to begin the entire multiscreen procedure anew. Furthermore, the set is configured based on only minimal direction by the user and without the user having to inefficiently scroll through on-screen menus.

When the user first asks for help, as by pressing the oversized "Call Outside Help" button 203 which dials and securely connects with the remote networking unit 34 (FIG. 2), the processor 126 establishes an individual account for the user in the knowledge database 40 (FIG. 1). It will be noted that this account will eventually reflect not only the viewing preferences of the initial user but also of any other member of the same household who uses the set.

Figure 5:
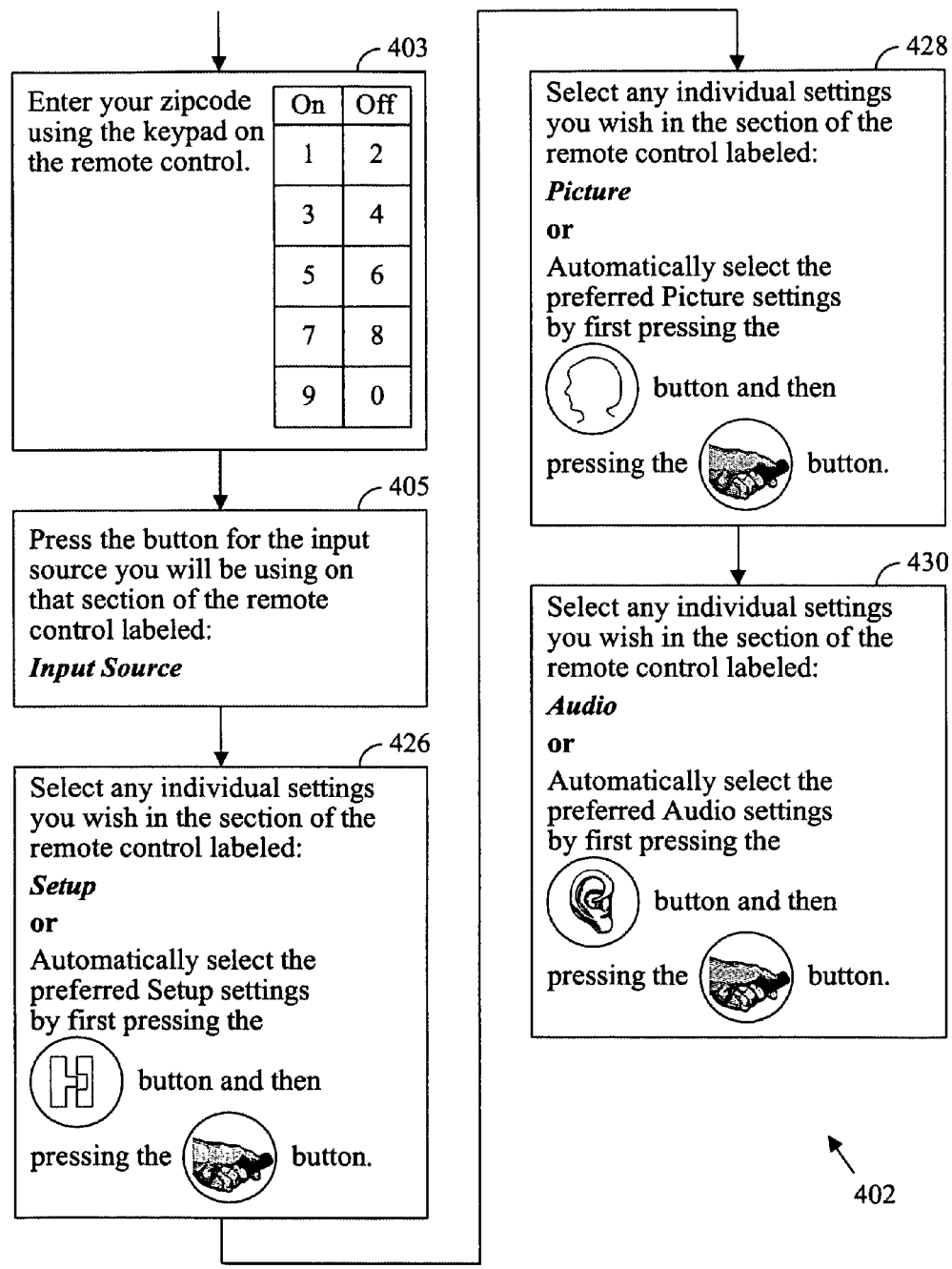
FIG. 5 shows an exemplary series of screens displayed on a set as depicted in FIG. 2 that are designed to prompt or elicit the user for information during initial setup of the set using the device depicted in FIG. 4 in accordance with an exemplary aspect of the present invention.

To develop information to configure the set automatically, the user is asked a minimal number of preliminary questions. FIG. 5 shows an exemplary series of screens 402 presented on display screen 112 (FIG. 2) for prompting the user during initial setup of the set. On screen 403, the user is elicited or asked to specify or enter his or her zip code via the number keypad 404 on the remote. This establishes the user's geographical location. The user can also be asked to enter the model number of the set 100 or, preferably, this information is gathered automatically by the collector 122 as part of the status information collected about the set. Also, even before the zipcode screen, a language screen can be displayed prompting the user to "enter the number" for the language the user wishes to use, followed, for example, by 1 for English, 2 para Espanol, 3 pour Francais, and so on.

The user, in screen 405, is elicited or asked to specify the input source that the user wishes to use via the correspondingly labeled input source button. For the exemplary remote device 400 shown, the user can specify an external programming source, using button 406 to specify a satellite dish, 408 to specify a broadcast antenna, or 410 to specify a cable television link. The user can also specify an internal source, using button 412 to specify the output line of a DVD player or 414 to specify an output line from an audio player or stereo. It is also possible to configure the monitoring module 132 of the set to automatically identify the input source and to convey this information through the interface module 130 to the remote collector 122.

It will be noted that where the source is of an external type, channel maps are available providing a listing of available channels for a given geographical location. The processor 126 preferably has access to and recognizes these channel maps as well as other relevant information on viewing conditions existing independently of the set such as day-of-week and time-of-day information. Over time, as the channel selections adopted by the users in a particular household are logged into the knowledge database 40, the processor 126 can, with increasing accuracy, identify and predict which of these available channels the users of that household are most likely to prefer. For example, the knowledge database's records may indicate that the users in a particular household prefer a cartoon on Sundays at 9:00 a.m., a sports channel on Sundays at 6:00 p.m., news at 11:00 p.m., a game show on Mondays at 2:00 p.m., and so on. However, even during initial setup where no viewing record is yet established for a particular user or household, the processor 126 can predictively identify a preferred channel selection based on that channel selection most frequently preferred by those other users having access to substantially the same channels and of substantially equivalent economic status with the particular user as gauged by zipcode.

In order to efficiently complete the initial setup procedure while providing a "complete" solution to the user, preferably the processor 126 further identifies automatically, and the remote software agent 128 further specifies automatically, preferred or default setup settings, picture settings, and audio settings. These settings preferably are tailored to the predicted or identified viewing preferences of the user or user's household. For example, if the zip code entered by the user is in an area with a high proportion of families with children, the remote software agent can specify that the parental lock be enabled as a default setting. Once the processor has automatically identified an initial channel selection, in the manner described above, it can then identify those picture settings (brightness, backlight, on-screen position control (OPC), color, contrast, tint, and sharpness) most frequently preferred, and hence specifically optimized, for the category type to which that initial channel belongs. For example, a relatively higher sharpness value would normally be preferable if the initial channel belongs to the sports category so that the user can follow a small ball during play. Conversely, a relatively lower sharpness value would normally be appropriate where the initial channel specified is an old movie containing scratches and other extraneous images due to deteriorating film quality. On the other hand, with an old movie, it would normally be desirable to minimize the image size relative to the screen to account for the different aspect ratio between the film and screen so that the sides of the image can be fully viewed. In like manner, the processor can identify those audio settings (treble, bass, balance, noise suppression, and audio output only) suitable for the particular category type to which the initial channel belongs.

Preferably, the preferred broadcast settings (channel, setup, picture, and audio) are not only identified or specified (as by video or audio instructions or tutorial at output device 112) but also the set is automatically configured remotely so that the display screen and speakers 112 automatically reflect these broadcast settings. For the exemplary system shown in FIG. 2, this is performed via control signals sent by the remote controller 134 to the local adjustment module 136. This eliminates any need to attempt to guide a confused user, who generally will be unfamiliar with the set's controls, through the process of manually configuring the set.

It may be noted that the broadcast settings that are automatically identified and selected in the manner described above can be chosen by the user not only during initial setup but also at any later time. For example, if the user tires of watching a particular satellite television channel, the user can press the reset channel button 416 to automatically switch to a preferred satellite channel determined, by processor 126, to belong to the user's most frequently preferred viewing category for that day-of-week and time-of-day. If the user later wishes to reset only the setup, picture or audio settings, he or she need only press the corresponding mode button 418, 420, or 422, respectively, directly followed by the reset settings button 424. This selects the preferred setup, picture, or audio settings, respectively, as determined by the processor 126 based on the channel category being viewed. If the user presses the reset settings button without immediately preceding it with a mode button, then all of the modes (setup, picture, and audio) are simultaneously changed to their preferred values. Or, the user can individually change just one setting type to its preferred value; for example, the user can adjust the brightness setting to its preferred level by pressing the brightness button 425 immediately followed by the reset settings button. Furthermore, the reset channel button 416 and reset setting button 424 can each be pressed repeatedly to call up the next most preferred setting, then the next most preferred setting after that, and so on, until the user is satisfied with the settings selected.

If the user so desires, he or she can choose to directly select the setup, picture, and audio settings using the corresponding buttons on the remote control device. During initial setup, screens 426, 428, and 430 prompt or invite the user to select any individual settings that the user wishes belonging to the setup, picture, and audio categories, respectively. Or, as each status screen further explains, the user can allow these selections to be adjusted remotely by pressing either the setup, picture, or audio mode button, 418, 420, or 422, respectively, immediately followed by the reset settings button 424. It will be seen that minimal direction is required on the part of the user to configure the set using the latter approach. Instead, the processor 126 working with the information contained in the knowledge base 40 automatically specifies the preferred selections and causes controller 134 to issue control signals to remotely configure the set automatically. This allows the selections to be intelligently selected using the superior, dynamically updated computing resources of the remote site. It will also be seen that, using the latter setup approach, with only minimal user input, the remote site is able to quickly and fully configure the set without requiring the user to delve into details of the configuration process.

To further highlight the advantages of the above-described method of setup, it will be noted that initial configuration proceeds independently of the user performing any on-screen menu operation using the conventional scrolling and select buttons 432*a-e*. In particular, the user is not required to inefficiently click multiple times to scroll through an on-screen menu nor is it necessary to repeat this action over multiple screens.

Moreover, it will be recognized that the above-described setup process is linear and that the user can make choices in an order other than that shown; for example, the audio settings can be set before the and independently of the picture or setup settings. The process does not follow a hierarchical tree where one selection forecloses another. In particular, initial setup is performed free of any menus or, more generally, free of any listings of mutually exclusive selections such as would force the user to choose between equally plausible menu choices and could lead to repeated false starts. The term "mutually exclusive," as used here and in the claims, signifies settings where making one selection precludes making another such that both cannot be integrably combined in a unified solution presented coextensively and contemporaneously to the user. Thus, making one channel selection precludes making another insofar as both cannot be presented in the same space at the same time (though two different channels or, more generally, broadcast "solutions," could be displayed in different spaces or windows on a single screen). On the other hand, mutually integrable solutions can include a channel setting, a setup setting, a picture setting, and an audio setting, since all these settings can be combined together in a single or unified broadcast solution occupying the same space at the same time. The term listing, as used above and in the claims, is intended to encompass not only conventional "drop-down" menu arrangements but also less usual arrangements such as a diagonal listing of labeled icons, for example.

If the user prefers, the user can choose to individually adjust the various setup, picture, and audio settings. Referring again to FIG. 4, under a section of the remote device 400 entitled Setup, the following individual controls are provided: 1) a parental control button 434 that toggles between enabled and disabled when pressed; 2) a closed captioning button 436 that similarly toggles; 3) a screen angle control 438 that, when pressed, shifts the angle of the screen relative to the viewer in accordance with the right/left and up/down buttons, 432*d*/432*a* and 432*b*/432*c*, respectively, until pressed again; 4) a picture flip button 440 that toggles between enabled and disabled; 5) a language button 442 that brings up a numbered list of languages from which the user can select a default language using the number keypad 404; and 6) an IKNOW button 444 the use of which is described below under Roman Numeral heading III.

Under the section of the remote device 400 entitled Picture, the following individual controls are provided: 1) a brightness button 425; 2) a backlight button 446; 3) an on-screen position control (OPC) button 448; 4) a color button 450; 5) a contrast button 452; 6) a tint button 454; and 7) a sharpness button 456. Buttons 425, 446, 450, 452, 454, and 456, when pressed, bring up an on-screen slider scale (a 2-dimensional slider scale in the case of the color control 450) that can then be adjusted using the right and left buttons 432*a* and 432*d*, respectively (and also the up and down buttons 432*b* and 432*c*, respectively, for the color button 450). The OPC button 448, if pressed once, shrinks the image size relative to the screen with each press of the select button 432*e*, or, if pressed quickly twice, expands the image size with each press of the select button; also, the OPC button, if pressed once, enables control of the x-y axis position of the image relative to the screen in conjunction with the directional buttons 432*a-d*. Under the Audio, section of the device, the treble, bass, and balance buttons, 458, 460, and 462, respectively, respond to slider control, while the noise suppress and audio out buttons, 464 and 466, respectively, toggle between enabled and disabled states.

Each time the user performs a remote control operation with the remote device 400, preferably this information is conveyed by the interface module 130 of the set to the remote processor 126 and knowledge database 40 for analysis. This forms the basis for establishing future preferences for the user or, to be more accurate, for the household of users, of that particular set. In determining which settings to specify as the "preferred" settings, preferably the processor factors in not only user interactions but also the input source, time-of-day, day-of-week, geographical location (e.g., zip code), electronic program guide information (in the form of metadata accompanying externally sourced programming channels), TiVO, and information about any peripheral players or devices connected to the set. For example, if the processor detects that cartoons are being viewed every weekday at 3:00 p.m., it can automatically enable the parental control feature normally actuated using button 434. These preferred settings are pushed to the set by the server 124 subject to user override.

The remote server 124 also uses smart grouping algorithms to separate individual users into various community groupings based on their similarities with respect to channel availability, viewing habits, and setting preferences. By using a smart grouping or categorization algorithm, the remote processor 126 is able to assign users with relative accuracy so that the users assigned to a particular community grouping do, in fact, share closely related preferences. Hence the processor is able to predict with relative accuracy which settings will be most satisfactory to a current user based not only on that current user's previous interactions but also on knowledge learned from the usage of previous users taken in aggregate.

Referring to FIGS. 2 and 4, when the settings for the set 100 are automatically adjusted by means of the remote controller 134, the user can signal either his adoption or rejection of these settings using either the thumbs-up or thumbs-down button, 468 or 470, respectively. If the user adopts the settings, this user preference information is then stored in the knowledge database 40 (FIG. 1). In this way, the processor and database dynamically learn from or are explicitly trained by the user. If, on the other hand, the user rejects the settings, then the processor determines the next most preferred settings for the set. By pressing one of the mode buttons, such as setup mode 418, picture mode 420, or audio mode 422, immediately preceding the thumbs-up or -down button, the user can indicate the specific nature of his or her like or dislike. Otherwise, pressing only the thumbs-up or thumbs-down button causes the processor to initiate change to the next most preferred channel selection as well as to change to new settings for the setup, picture, and audio as optimized based on the type of channel selected. In other words, the user is given the opportunity to start afresh with an entirely new "solution" as used here in the sense of mutually complementary multiple settings.

Pulling together the information provided above and applying it to the initial setup phase, it will be recognized that in determining which settings to first specify, the remote processor 126 initially accesses information on the favored selections of users outside the location of the particular set, as the preferences of the particular user of the set will not yet be logged into the knowledge database 40. The processor statistically analyzes automatically these favored selections to determine which are most frequently favored by these outside users in viewing contexts substantially matching the setup context of the particular user, that is, which substantially correspond in terms of input source, channel availability, model type, day-of-week, time-of-day, and zip code demographics. After the processor has identified the most frequently favored "complete" solution, which solution is composed of mutually integrable channel, setup, picture, and audio selections, this solution is specified or provided to the user, preferably by automatically configuring the set so that the display screen and speakers 112 reflect this solution. The thumbs-up button 468 and thumbs-down button 470 on the remote control device enable the particular user to indicate approval and disapproval, respectively of this first solution. If the user presses the thumbs-down button to indicate disapproval, the above analyzing, specifying, and enabling steps are repeated for the next most favored solution. The user can press the thumbs-down button repeated times, each time repeating the above steps and systematically providing other selections that are favored increasingly less frequently than any favored selection specified in a preceding iteration, until the particular user reaches a solution that the user approves of.

Sometime after the initial setup phase, eventually what can be termed the ongoing "maintenance" phase is reached in which sufficient information about the preferences of a particular household have been logged into the knowledge database 40 to allow the processor 126 to use such information to reliably predict the viewing preferences of individual users in that household. When a specific user then presses the reset channel button 416, the processor accesses information on the selections most favored by users within, not outside of, the location of the set. The processor statistically analyzes automatically this information to determine those mutually integrable selections most frequently favored by the individual users in viewing contexts substantially matching the presently ongoing viewing context of the specific user, that is, that correspond in terms of input source, day-of-week, and time of day. After the processor has identified the most frequently favored channel setting (based on the most frequently favored channel category favored in that household in that viewing context), the processor automatically identifies further the setup, picture, and audio selections best optimized for viewing of that channel setting. This complete "solution" is then specified or provided to the user, preferably by automatically configuring the set so that the display screen and speakers 112 reflect the solution. In like manner to the initial setup phase, the thumbs-up and thumbs-down buttons, 468 and 470, respectively, enable the user to express approval or disapproval of the remotely selected solution, and the process can be repeated with as many iterations as are needed until the user approves of the solution presented.

With respect to the remote control device 400 shown in FIG. 4, the particular buttons and modes of operation above-described have been selected for purposes of illustration, and other buttons or functions may be added or subtracted without departing from at least the broader aspects of the present system. For example, the range of buttons can be extended to cover functions appropriate to a peripheral device connected to the set so that play, pause, fast forward, reverse, and record buttons can be added where a video recorder is to be connected. The same can be done for DVD players, Blue Ray, and so on.

III. IKNOWLEDGE

Figure 6:
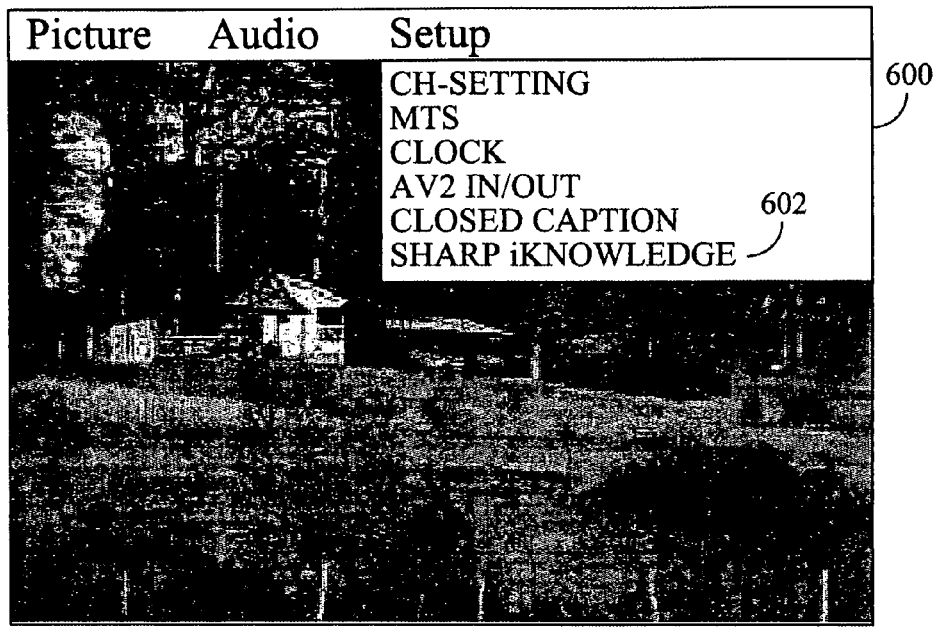
FIGS. 6-11 show different screen displays of a set as depicted in FIG. 2 designed to help the user resolve commonly encountered issues in accordance with a further exemplary aspect of the present invention.

FIGS. 6-11 depict various screen displays available to the user in an optional help mode and designed to help the user efficiently resolve commonly encountered broadcast issues by immediately providing a solution. This feature is called "IKNOWLEDGE" (or "IKNOW" as abbreviated) because it enables the user to take advantage of information dynamically recorded in the remote knowledge database 40 (FIG. 1) as processed through processor 126 (FIG. 2) and conveyed through software agent 128. To request or invoke this help mode, if the user is using an exemplary remote control device 400 as depicted in FIG. 4, the user merely presses the IKNOW button 444, that is, this option is available through one-button access. Alternatively, as depicted in FIG. 6, this option can be requested through a conventional on-screen dropdown menu 600, for example, by using the conventional directional keys 432*a-d* and enter button 432*e* on the remote device to scroll to and select, respectively, the Sharp iKnowledge option 602.

Figure 7:
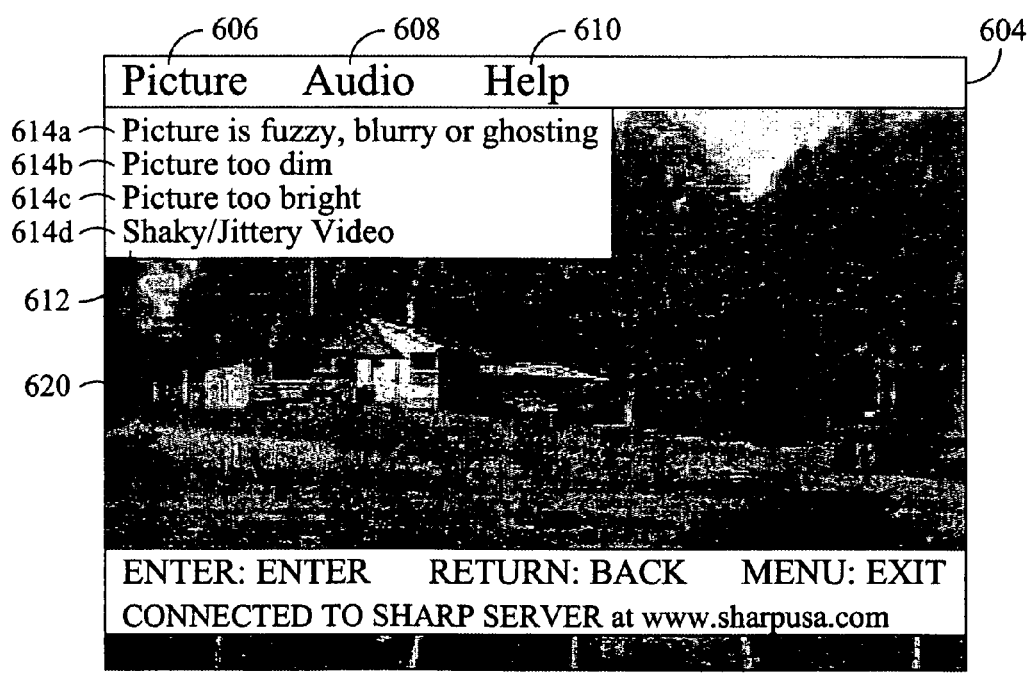
Figure 8:
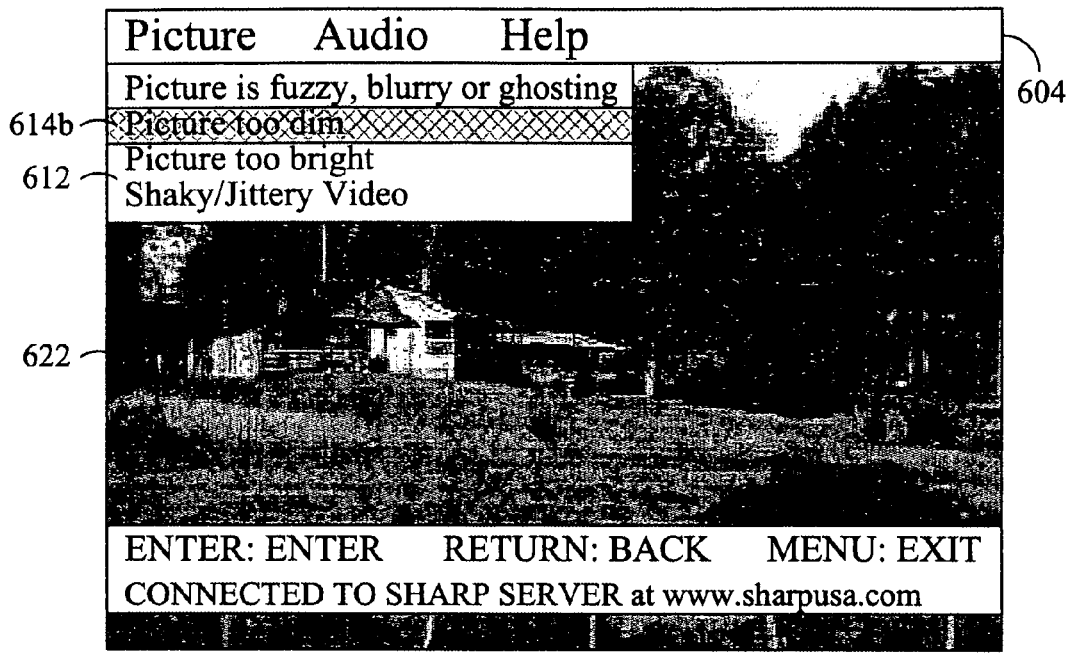

Referring to FIG. 7, after the user has requested help from the IKNOWLEDGE system, a menu bar 604 is displayed divided into different help sections or broadcast feature categories designed to be intuitively accessible to a user seeking help. For example, using remote control keys 432a-e, the user can go to and select the "Picture" category 606 if he or she is experiencing difficulties with the broadcast picture. Similarly, the user can select the "Audio" category 608 for audio help or the "Help" category 610 for all other issues, such as help needed in initially setting up or configuring the set.

Figure 11:
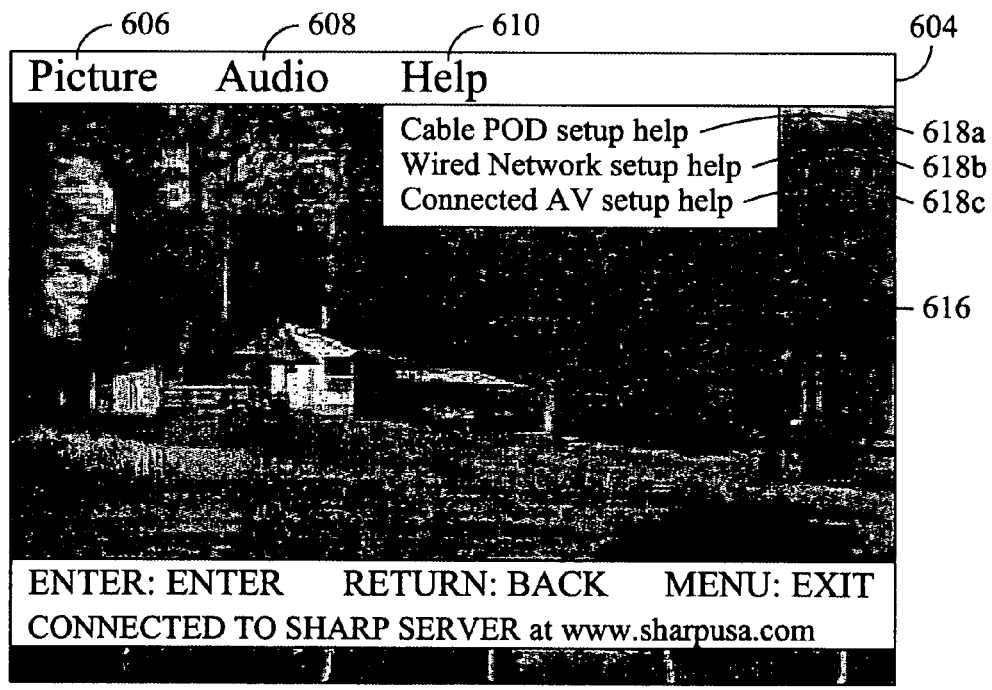

In FIG. 7, the user has selected the Picture category 606 which causes the remote software agent 128 to deliver a listing 612 of possible outcomes relating to or for that category. In FIG. 7, the possible outcomes are outcomes to be avoided, for example, outcome 614a recites the "picture is fuzzy, blurry or ghosting," outcome 614b recites "picture too dim," 614c recites "picture too bright," and 614d recites "shaky/jittery video." However, the outcomes can also list ones that the user wishes to establish, as shown in FIG. 11, where the user has selected the Help category 610 and the resulting listing 616 includes the following help request outcomes: 1) "cable POD setup help" 618a where POD signifies point-of-display; 2) "wired network setup help" 618b; and 3) "connected AV setup help 618c where AV signifies audiovisual. Each of these help request outcomes, if selected by the user, preferably causes a video, audio, or image-based tutorial to pop-up on the screen containing step-by-step instructions explaining how the user can locally make the desired setup connections.

Referring again to FIG. 7, it will be noted that the list of possible picture outcomes 614a-d is relatively short or abbreviated. Preferably the user is presented with a listing of manageable proportions showing only those possible outcomes most commonly identified historically as targeted issues by other users. For example, if a majority of other users are targeting a dim picture as an issue of concern, this possible picture outcome is then listed, as at 614b, regardless of whether the outcome is the result of fixable causes, such as hard-to-read adjustment instructions, or natural aging of set components, or even completely subjective considerations. Regardless, then, of exactly why each outcome is of common concern, the listing will show those possible outcomes most commonly targeted by users across the entire network 20.

It will be noted that the listing 612 shown in FIG. 7 is preferably revised continually, that is, the listing depicted represents the appearance of the listing at only one particular instant in time. As users across the entire network target new outcomes, this updated information arrives at the remote site and the information on targeted outcomes stored in the knowledge database 40 is dynamically revised automatically. The processor 126 and remote software agent 128 automatically update the listing to add or subtract any new or obsolete most commonly targeted outcomes, respectively, so that whenever the user selects a general category, he or she calls up an automatically up-to-date listing for that particular instant in time. Also, as just indicated, the listing 612 is remotely generated automatically without any need on the remote side, for example, for any human intervention with its relatively prohibitive attendant costs.

Another advantage of the particular format of listing 612 depicted in FIG. 7 is that the user is saved the bother of trying to formulate a description of his or her problem or concern. Instead, all the user is required to do is to review the brief list of possible outcomes and to select that one outcome most closely approaching his or her own concern. This is preferable to the conventional approach where the user telephones a customer support site and tries to adequately describe his or her concern to a customer service representative. It is not only much more efficient for the user to select a choice from a brief list, but, under the conventional approach, the user may only have a vague idea something is off kilter without being able to express exactly what. It will be recognized, moreover, that this aspect enables further efficiency early on at the problem identification stage and not just, for example, at the stage of solution implementation.

Continuing with the example illustrated in FIG. 7, the scroll and select keys 432a-e (FIG. 4) on the remote control 400 enable the user to identify or select a targeted one of the possible outcomes, such as the "Picture too dim" outcome 614b. In response, the remote server 124 (FIG. 2) remotely specifies a preferred setting for the underlying broadcast characteristic, here the brightness characteristic, designed to resolve the user-targeted outcome. Although, it is possible to present on-screen or audio instructions to the user explaining just how to adjust the brightness setting to its preferred level using individual control 425 on the remote device, preferably the remote server 124 bypasses this intermediate step and actually remotely selects automatically the preferred level for the user, as suggested by the brighter picture image 622 in FIG. 8 relative to the dimmer image 620 in FIG. 7. This selection is made, in accordance with the "Remote Presence" aspect described above, by a suitable control signal from the remote controller 134 to the local adjustment module 136 via the interface module 130, which adjustment module then instructs the operational setting selector 116 to adjust the brightness to its preferred level. More, generally, more than one broadcast setting or characteristic can be simultaneously adjusted so that a complete "solution" is provided to the user. In this manner, then, not only identification of the problem, but also implementation of the solution, is efficiently addressed automatically without, for example, prolonged dialogue required between the user and a customer service representative.

Figure 9:
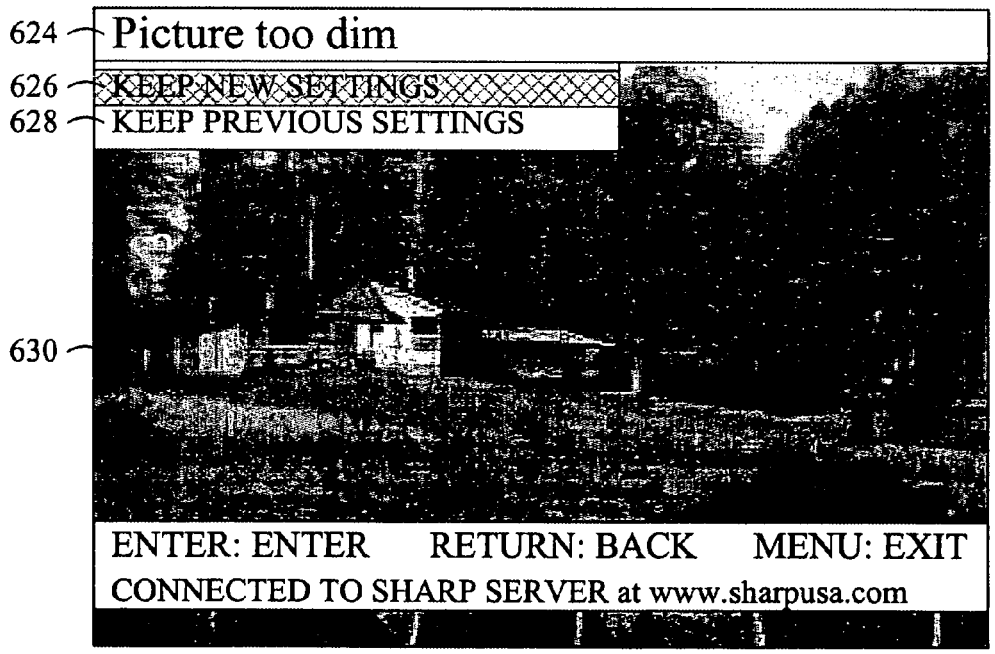

The user preferably is now given the option of selectively adopting or rejecting the change in broadcast characteristic(s) that have been automatically selected remotely. This can be enabled through on-screen means as indicated by FIG. 9. FIG. 9 shows how a brief description 624 of the changed outcome ("Picture too dim") is presented on-screen and also how the user is given the option either to "keep new settings" 626 or to "keep previous settings" 628. In FIG. 9, the user has just selected option 628 as indicated by the darker picture image 630 in FIG. 9 contrasted with the lighter image 622 in FIG. 8.

The user can also selectively adopt or reject the automatically implemented solution using the thumbs-up or thumbs-down buttons, 468 or 470, respectively, on the remote control device 400 (FIG. 4). Here, if the user rejects the "most" preferred solution by pressing the thumbs down button, then the remote server 124 automatically selects the "next most" preferred solution. If the user rejects this solution, then the next most preferred solution after that is automatically selected. Thus the user can repeat the process as many times as desired until a solution is obtained that he or she finds satisfactory.

If the user adopts a remotely adjusted solution, this information is preferably conveyed by the local interface module 130 (FIG. 2) to the remote detector 120 so it can be logged into the remote knowledge database 40 (FIG. 1). This information is used by the processor 126 to automatically determine which settings in relation to which outcomes most frequently provide successful solutions as generally perceived by users. The solutions most commonly perceived as successful are given priority in terms of being reused when subsequent users request help with a similar outcome or issue.

Figure 10:
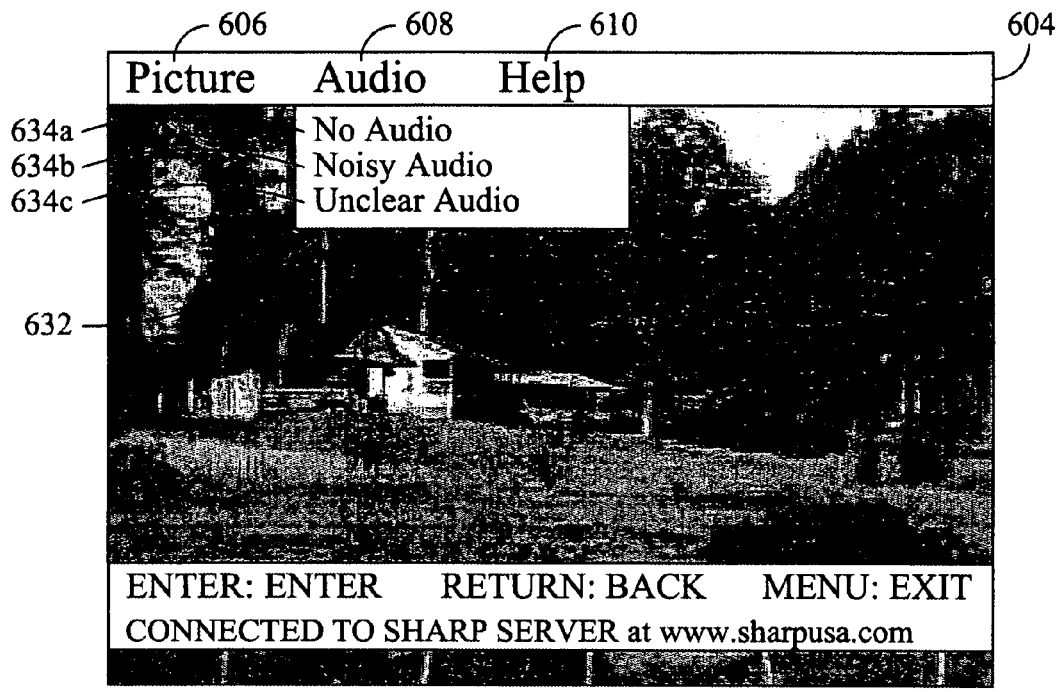

FIG. 10 shows, under the general feature category of "Audio" 608, a listing 632 of possible audio outcomes or issues including 1) "no audio" 634a; 2) "noisy audio" 634b; and 3) "unclear audio" 634c. What was said above in connection with FIG. 7 and its possible picture outcomes applies with equal force here. If the user selects the unclear audio option, preferably the remote detector 120 (FIG. 2) queries the local monitoring module 132, via interface module 130, to determine more precisely the nature of the problem; for example, the problem may be with one or more of the treble, bass, and noise suppress settings. Thus, the remote server 124 may direct the local adjustment module to simultaneously change more than one setting to new preferred values as part of providing the user with a complete solution, such as lowering the treble, increasing the bass, and enabling the noise suppress feature.

It will be noted that the help option now described under this Roman Numeral heading requires somewhat more involvement on the part of the user than other system aspects described earlier, but still requires much less detailed knowledge about individual setting adjustment than conventional approaches demand. A more sophisticated or advanced user, on the other hand, retains full control over the set. Thus, if an advanced user is experiencing unclear audio sound, he or she could directly operate the appropriate controls on the remote device 400 to resolve this concern. For example, if the treble is too high, the bass too low, and the noise suppress disabled, he or she could use buttons 458, 460, and 464 on the remote to adjust each individual characteristic or setting to its appropriate value. This is in keeping with the broader principles of the present system that a fully informed user who is fully cognizant of the set's features makes the best prospective customer of the manufacturer's high end products. With the help option here described, on the other hand, it is implicitly recognized that not every user and, indeed most users, have neither the time nor inclination to become thus informed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for helping a plurality of end users configure respective consumer video sets, said method comprising:
    (a) maintaining a remote support site supporting each of said plurality of end users and remotely located from each of said end users;
    (b) presenting to the users of each said video set a plurality of presented combinations of settings available for said video sets, each one of said settings related to user-selectable parameters that influence the manner in which a user perceives content existentially presented by a said consumer video set, and each having a range of selectable values, and prompting said users to specify at least one of said plurality of presented combinations;
    (c) configuring each said video set by automatically and remotely selecting from said support site, for each setting in the user-specified at least one of said plurality of presented combinations, a respective value within the said range of selectable values associated with said user-specified one of said plurality of settings;
    (d) where said step of presenting a plurality of combinations of settings includes the steps of: (i) accessing the respective settings favored in previous viewing contexts by users outside of the location of said respective set, statistically analyzing automatically the outside favored settings to determine the mutually integrable outside settings most frequently favored by said outside users in previous viewing contexts substantially matching a setup context specified by a said user, and automatically presenting said most frequently favored mutually integrable outside settings as a first one of said presented combinations; and (ii) enabling each said user to selectively indicate approval or disapproval of said presented combination using a remote device, and if disapproval is indicated, successively repeating said presenting and enabling for other statistically analyzed said combinations, each successive other said presented combination being favored less frequently than the combination presented in a preceding iteration.

2. The method of claim 1 including the step of prompting said user to specify additional ones of said settings based on said user-specified at least one selection.

3. The method of claim 1 including performing said step of prompting free of displaying any on-screen menu.

4. The method of claim 1 wherein said most frequently favored mutually integrable selections include a picture setting.

5. The method of claim 1 including providing the remote control device having a thumbs up- and a thumbs down button for enabling said user to indicate approval and disapproval, respectively.

6. The method of claim 1 further including, after completing said setup, remotely detecting at said support site the viewing selections favored in various viewing contexts by the individual users within the location of each respective set, statistically analyzing automatically the individually favored viewing selections to determine the mutually integrable individual viewing selections most frequently favored by said individual users in viewing contexts substantially matching a presently ongoing viewing context of a specific user of said respective set, and remotely configuring from said support site said respective set in accordance with said most frequently favored mutually integrable individual viewing selections.

7. The method of claim 6 wherein said most frequently favored mutually integrable viewing selections include picture settings and sound settings and said presently ongoing viewing context is characterized by the program category of a channel setting selected by said specific user.

8. A method for helping a plurality of end users configure respective media-playing sets comprising:
    (a) maintaining a remote support site supporting each of said plurality of end users and remotely located from each of said end users;
    (b) remotely configuring a respective set from said support site using a first one of a plurality of predetermined combinations of at least two values, each value being within a respective range of values associated with a respectively different setting for said multimedia playing set, each said setting related to user-selectable parameters that influence the manner in which a user perceives content existentially presented by a said consumer video sets, and each capable of manual configuration by said user, said first one of a plurality of different combinations being remotely configured by accessing the respective selections favored by users outside of the location of said respective set, and statistically analyzing automatically the outside favored selections to determine the mutually integrable outside selections most frequently favored by said outside users;
    (c) enabling the user of said set to reject said one of plurality of predetermined combinations of at least two values using a remote device; and
    (d) selectively and remotely configuring said respective set using a second one of said plurality of predetermined combinations of at least two values if said user rejects said first one of said plurality of predetermined combinations of different values, said second one of said plurality of predetermined combinations being remotely configured by accessing the respective selections favored by users outside of the location of said respective set, statistically analyzing automatically the outside favored selections to determine the next-most frequently favored mutually integrable outside selections favored by said outside users;

(e) repeating steps (c) and (d) until said user does not reject the most recently presented one of said plurality of different combinations.

9. The method of claim 8 including continually revising said plurality of predetermined combinations of at least two values.

10. The method of claim 9 including revising said plurality of predetermined combinations of at least two values to include those ones of said sets of values most frequently identified historically as targeted ones by the users of said sets.

11. The method claim 8 including remotely recording a selected combinations of values if not rejected and later reusing said selected set of values in a later repeating of said remotely specifying step.

12. The method of claim 8 including remotely configuring said set in response to a request for help by the user of the respective set.

* * * * *